US012762954B2

(12) United States Patent
Sun et al.

(10) Patent No.: US 12,762,954 B2
(45) **Date of Patent: *Oct. 13, 2026**

(54) VEHICLE-SEARCHING GUIDANCE METHOD AND APPARATUS, TERMINAL DEVICE, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Zhongyang Sun, Shenzhen (CN); Yu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 37 days.

This patent is subject to a terminal disclaimer.

(21) Appl. No.: 18/925,170

(22) Filed: Oct. 24, 2024

(65) Prior Publication Data

US 2025/0054392 A1 Feb. 13, 2025

Related U.S. Application Data

(63) Continuation of application No. 17/968,550, filed on Oct. 18, 2022, now Pat. No. 12,154,431, which is a (Continued)

(30) Foreign Application Priority Data

Feb. 20, 2021 (CN) ........................ 202110193653.6

(51) Int. Cl.
*G08G 1/14* (2006.01)

(52) U.S. Cl.
CPC ............. *G08G 1/146* (2013.01); *G08G 1/148* (2013.01); *G08G 1/149* (2013.01)

(58) Field of Classification Search
CPC ........ G08G 1/148; G08G 1/149; G08G 1/005; G08G 1/144; G08G 1/205; G06F 9/451; G06V 20/20; G06V 20/46; G06V 10/95
See application file for complete search history.

(56) References Cited

U.S. PATENT DOCUMENTS

2004/0128317 A1 7/2004 Sull et al.
2014/0266803 A1 9/2014 Bulan et al.

(Continued)

FOREIGN PATENT DOCUMENTS

CN 103024561 A 4/2013
CN 104023181 A 9/2014

(Continued)

OTHER PUBLICATIONS

China National Intellectual Property Administration (CNIPA) Office Action 1 for 202110193653.Sep. 28, 2021 21 Pages (including translation).

(Continued)

*Primary Examiner* — Sisay Yacob
(74) *Attorney, Agent, or Firm* — Anova Law Group, PLLC

(57) ABSTRACT

A vehicle-searching guidance method includes: displaying a vehicle-searching guidance interface in response to a first trigger operation on a first control, the vehicle-searching guidance interface being used for providing guidance information for vehicle searching; transmitting a multimedia content obtaining request to an electronic device in response to a second trigger operation on a second control on the vehicle-searching guidance interface; receiving multimedia guidance content returned by the electronic device according (Continued)

to the multimedia content obtaining request, the multimedia guidance content including environmental information of a parking space in which a vehicle is parked; and presenting the multimedia guidance content for a user to search for the vehicle.

20 Claims, 14 Drawing Sheets

Related U.S. Application Data continuation of application No. PCT/CN2022/075803, filed on Feb. 10, 2022.

(56) References Cited

U.S. PATENT DOCUMENTS

| | | | | |
|---|---|---|---|---|
| 2018/0151199 | A1 | 5/2018 | Chen et al. | |
| 2020/0017099 | A1 | 1/2020 | Yamaguchi et al. | |
| 2020/0365026 | A1* | 11/2020 | Noguchi | G01C 21/3685 |
| 2021/0166275 | A1* | 6/2021 | Tong | G06F 3/147 |
| 2022/0114893 | A1* | 4/2022 | Kim | G08G 1/143 |

FOREIGN PATENT DOCUMENTS

| | | | | | |
|---|---|---|---|---|---|
| CN | 104809771 | A | * | 7/2015 | |
| CN | 106921693 | A | * | 7/2017 | H04L 67/06 |
| CN | 107862899 | A | | 3/2018 | |
| CN | 108510786 | A | | 9/2018 | |
| CN | 109166344 | A | | 1/2019 | |
| CN | 109377779 | A | | 2/2019 | |
| CN | 109466546 | A | | 3/2019 | |
| CN | 110223528 | A | | 9/2019 | |
| CN | 110232826 | A | | 9/2019 | |
| CN | 110234069 | A | | 9/2019 | |
| CN | 110491166 | A | | 11/2019 | |
| CN | 110556022 | A | | 12/2019 | |
| CN | 110599794 | A | | 12/2019 | |
| CN | 110958470 | A | | 4/2020 | |
| CN | 111524381 | A | | 8/2020 | |
| CN | 111885253 | A | * | 11/2020 | H04L 67/52 |
| CN | 113012464 | A | | 6/2021 | |

OTHER PUBLICATIONS

The World Intellectual Property Organization (WIPO) International Search Report for PCT/CN2022/075803 May 12, 2022 8 Pages (including translation).

* cited by examiner

VEHICLE-SEARCHING GUIDANCE METHOD AND APPARATUS, TERMINAL DEVICE, ELECTRONIC DEVICE, AND COMPUTER-READABLE STORAGE MEDIUM

CROSS-REFERENCES TO RELATED APPLICATIONS

This application is a continuation of U.S. application Ser. No. 17/968,550 filed on Oct. 18, 2022, U.S. application Ser. No. 17/968,550 is a continuation application of PCT Patent Application No. PCT/CN2022/075803, entitled "VEHICLE SEARCHING GUIDANCE METHOD AND APPARATUS, TERMINAL DEVICE, ELECTRONIC DEVICE, COMPUTER-READABLE STORAGE MEDIUM, AND PROGRAM PRODUCT" and filed on Feb. 10, 2022, which claims priority to Chinese Patent Application No. 202110193653.6 filed on Feb. 20, 2021, the entire contents of all of which are incorporated herein by reference.

FIELD OF THE TECHNOLOGY

The present disclosure relates to the field of Internet of vehicles, and in particular, to a vehicle-searching guidance method and apparatus, a terminal device, an electronic device, a computer-readable storage medium, and a computer program product.

BACKGROUND OF THE DISCLOSURE

Driving is a common way of traveling. Based on this, many parking lots are built in cities or towns to meet people's parking requirements. In real life, when returning to a parking lot, a target object (e.g., a user) may not find a parking space in which a vehicle of the target object is parked, bringing trouble to travel of the target object. For example, the problem may occur at a parking lot of a large-scale mall, a large parking lot, a multi-floor parking lot, and the like. The target object has lower efficiency of finding the vehicle due to less guidance information provided to the target object.

SUMMARY

Embodiments of the present disclosure provide a vehicle-searching guidance method and apparatus, a terminal device, an electronic device, a computer-readable storage medium, and a computer program product, to improve vehicle searching efficiency.

An embodiment of the present disclosure provides a vehicle-searching guidance method, performed by a terminal device, the method including: displaying a vehicle-searching guidance interface in response to a first trigger operation on a first control, the vehicle-searching guidance interface being used for providing guidance information for vehicle searching; transmitting a multimedia content obtaining request to an electronic device in response to a second trigger operation on a second control on the vehicle-searching guidance interface; receiving multimedia guidance content returned by the electronic device according to the multimedia content obtaining request, the multimedia guidance content including environmental information of a parking space in which a vehicle is parked; and presenting the multimedia guidance content for a user to search for the vehicle.

An embodiment of the present disclosure provides a vehicle-searching guidance method, performed by an electronic device, the method including: receiving a multimedia content obtaining request transmitted by a terminal device; obtaining multimedia guidance content in response to the multimedia content obtaining request, the multimedia guidance content including environmental information of a parking space in which a vehicle is parked, and the multimedia guidance content being obtained based on an acquisition apparatus coupled to the vehicle; and transmitting the multimedia guidance content to the terminal device, the multimedia guidance content being used for guiding a user to search for the vehicle.

An embodiment of the present disclosure provides a vehicle-searching guidance apparatus, including: an information display module, configured to display a vehicle-searching guidance interface in response to a first trigger operation on a first control, the vehicle-searching guidance interface being used for providing guidance information for vehicle searching; a first transmission module, configured to transmit a multimedia content obtaining request to an electronic device in response to a second trigger operation on a second control on the vehicle-searching guidance interface; and a first receiving module, configured to receive multimedia guidance content returned by the electronic device according to the multimedia content obtaining request, the multimedia guidance content including environmental information of a parking space in which a vehicle is parked, the information display module, further configured to guide, by playing the multimedia guidance content, a target object to search for the vehicle.

An embodiment of the present disclosure provides a vehicle-searching guidance apparatus, including: a second receiving module, configured to receive a multimedia content obtaining request transmitted by a terminal device; a video obtaining module, configured to obtain multimedia guidance content in response to the multimedia content obtaining request, the multimedia guidance content recording environmental information of a parking space in which a vehicle is parked, and the multimedia guidance content being obtained based on an acquisition apparatus coupled to the vehicle; and a second transmission module, configured to transmit the multimedia guidance content to the terminal device, the multimedia guidance content being used for guiding a target object to search for the vehicle.

An embodiment of the present disclosure provides a terminal device for vehicle-searching guidance, including: a first memory, configured to store executable instructions; and a first processor, configured to implement, when executing the executable instructions stored in the first memory, the vehicle-searching guidance method on a terminal device side provided in this embodiment of the present disclosure.

An embodiment of the present disclosure provides an electronic device for vehicle-searching guidance, including: a second memory, configured to store executable instructions; and a second processor, configured to implement, when executing the executable instructions stored in the second memory, the vehicle-searching guidance method on an electronic device side provided in this embodiment of the present disclosure.

An embodiment of the present disclosure provides a non-transitory computer-readable storage medium, storing executable instructions configured to implement, when executed by a first processor, the vehicle-searching guidance method on a terminal device side provided in this embodiment of the present disclosure; or implement, when executed by a second processor, the vehicle-searching guidance method on an electronic device side provided in this embodiment of the present disclosure.

The embodiments of the present disclosure have the following beneficial effects: When detecting a second trigger operation on a second control on a vehicle-searching guidance interface, a terminal device determines that a target object has requirements for guiding vehicle searching through multimedia guidance content, transmits a multimedia content obtaining request, receives returned multimedia guidance content that records environmental information of a parking space, and displays the multimedia guidance content, so that environmental details of the parking space are provided to the target object through the multimedia guidance content, thereby increasing information provided to the target object during vehicle-searching guidance, shortening a time for the target object to search for a parking space in which a vehicle is parked, and improving the vehicle searching efficiency.

DESCRIPTION OF EMBODIMENTS

Figure 1:
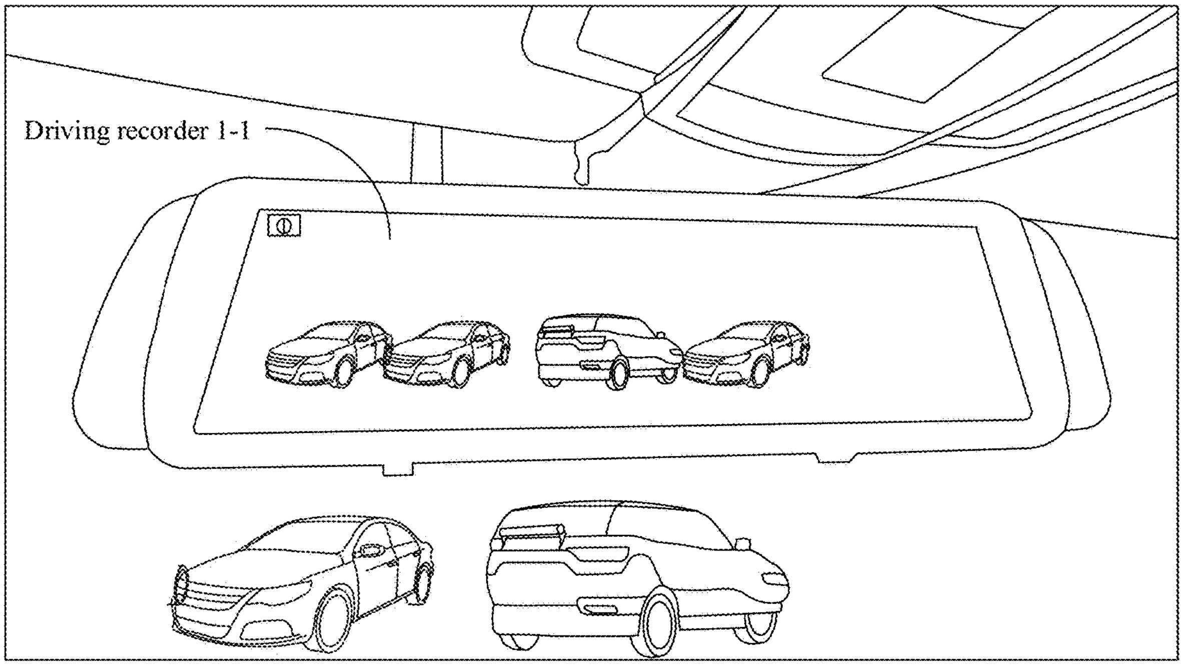
FIG. 1 is a schematic diagram of an in-vehicle acquisition apparatus.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following description, the terms "some embodiments" and "one or more embodiments" describe subsets of all possible embodiments, but it may be understood that "some embodiments" and "one or more embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in this specification are the same as that usually understood by a person skilled in the art to which the present disclosure belongs. In the present disclosure, terms used in the specification of the present disclosure are merely intended to describe objectives of the specific embodiments, but are not intended to limit the present disclosure.

Before the embodiments of the present disclosure are further described in detail, nouns and terms involved in the embodiments of the present disclosure are described. The nouns and terms provided in the embodiments of the present disclosure are applicable to the following explanations.

1) Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, artificial intelligence is a comprehensive technology of computer sciences, which attempts to understand essence of intelligence and produces a new intelligent machine that can react in a manner similar to human intelligence. Artificial intelligence is to study the design principles and implementation methods of various intelligent machines, to enable the machines to have the functions of perception, reasoning, and decision-making.

The artificial intelligence technology is a comprehensive subject, relating to a wide range of fields, and involving both hardware and software techniques. The basic artificial intelligence technologies generally include technologies such as a sensor, a dedicated artificial intelligence chip, cloud computing, distributed storage, a big data processing technology, an operating/interaction system, and electromechanical integration. Artificial intelligence software technologies mainly include several major directions such as a computer vision technology, a speech processing technology, a natural language processing technology, and machine learning/deep learning.

2) Computer vision (CV) is a science that studies how to use a machine to "see", and furthermore, refers to using a camera and a computer to replace human eyes for performing machine vision, such as recognition, tracking, and measurement, on a target, and further perform graphic processing, so that the computer processes the target into an image more suitable for human eyes to observe, or an image transmitted to an instrument for detection. As a scientific discipline, computer vision studies related theories and technologies and attempts to establish an artificial intelligence system that can obtain information from images or multidimensional data. The computer vision technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

3) Machine learning (ML) is a multi-field interdisciplinary subject involving the probability theory, statistics, the approximation theory, convex analysis, the algorithm complexity theory, and the like. Machine learning specializes in studying how a computer simulates or implements a human learning behavior to obtain new knowledge or skills, and reorganize an existing knowledge structure, so as to keep improving its performance. Machine learning is the core of artificial intelligence, is a basic way to make the computer intelligent, and is applied to various fields of artificial intelligence. Machine learning and deep learning usually include technologies such as artificial neural network, belief network, reinforcement learning, transfer learning, and inductive learning.

4) Vehicle searching is a process in which a user searching for a parking space where a vehicle is parked. For example, a process in which the user enters the mall for shopping after parking the vehicle in the parking space such as a parking space in a mall, and when leaving the mall after shopping, the user needs to return to the parking lot to find which parking space where the vehicle is parked. Such a process is also referred to as reverse vehicle searching.

5) In-vehicle acquisition apparatus: It is a camera mounted on the vehicle and capable of capturing a surrounding environment of the vehicle. The in-vehicle acquisition apparatus includes cameras such as a camera of a driving recorder mounted on the vehicle, a surround view camera, a 360-degree panoramic camera around the vehicle, and the like.

Figure 2:
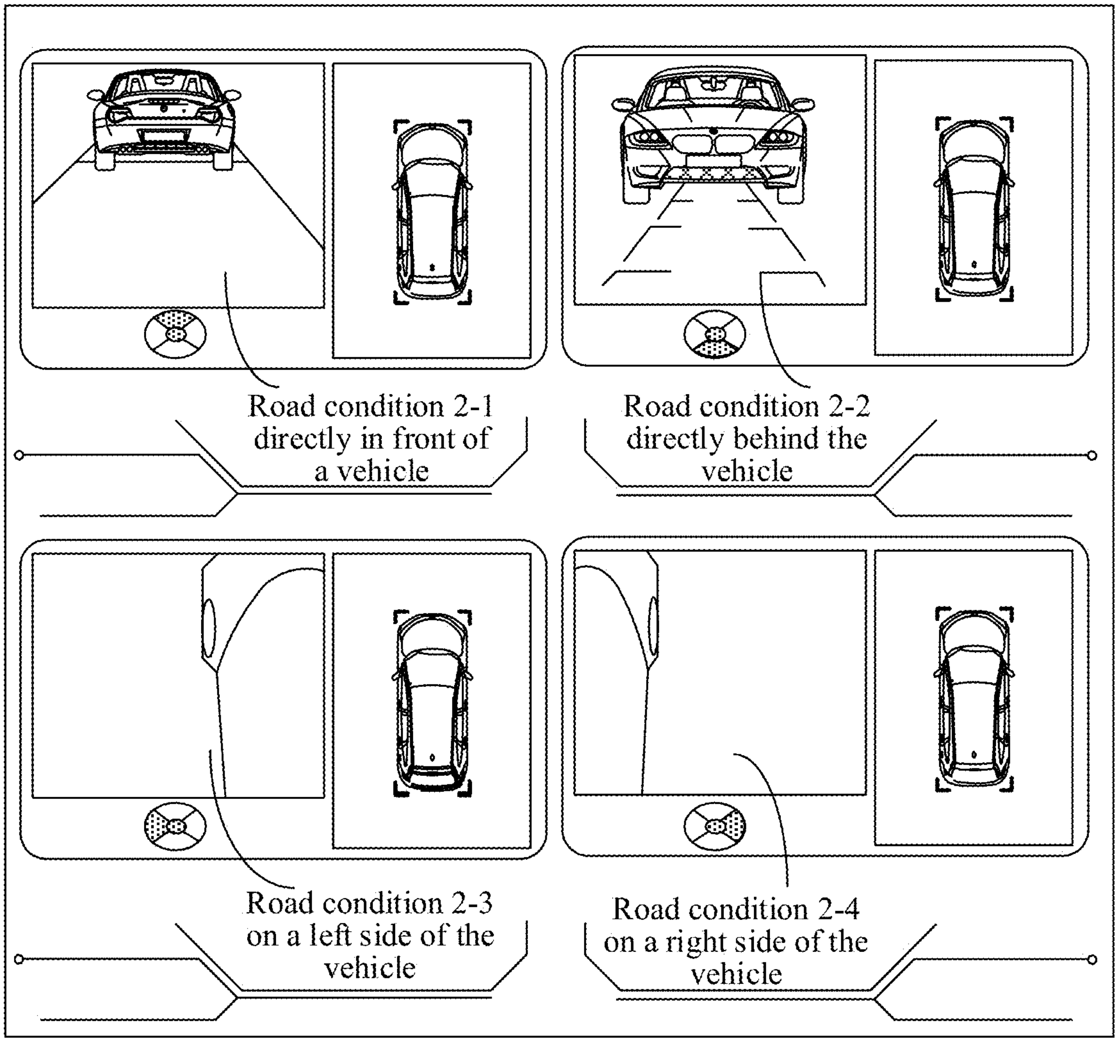
FIG. 2 is another schematic diagram of an in-vehicle acquisition apparatus.

Exemplarily, FIG. 1 is a schematic diagram of an in-vehicle acquisition apparatus. Referring to FIG. 1, a driving recorder 1-1 is mounted directly in the middle of a windshield of the vehicle, and the in-vehicle acquisition apparatus may be the camera mounted on the driving recorder. FIG. 2 is another schematic diagram of an in-vehicle acquisition apparatus. As shown in FIG. 2, the in-vehicle acquisition apparatus may include a front view camera mounted on a head portion of a vehicle body, to capture a road condition 2-1 directly in front of the vehicle. The in-vehicle acquisition apparatus may include a rear view camera mounted on a tail portion of the vehicle body, to capture a road condition 2-2 directly behind the vehicle. The in-vehicle acquisition apparatus may include a left view camera mounted on a left side of the vehicle body, to capture a road condition 2-3 on the left side of the vehicle. The in-vehicle acquisition apparatus may include a right view camera mounted on a right side of the vehicle body, to capture a road condition 2-4 on the right side of the vehicle. Since the front view camera, the rear view camera, the left view camera, and the right-view camera can capture surrounding conditions of the vehicle from different viewing angles, the front view camera, the rear view camera, the left view camera, and the right-view camera are all belong to the surround view camera.

6) The expression "in response to" is used for representing a condition or state on which one or more to-be-performed operations depend. When the condition or state is met, the one or more operations may be performed immediately or have a set delay; and there is no limitation to the sequence of performing the operations unless explicitly stated.

Embodiments of the present disclosure provide a vehicle-searching guidance method and apparatus, a terminal device, an electronic device, a computer-readable storage medium, and a computer program product, to improve vehicle searching efficiency. The terminal device for vehicle-searching guidance provided in this embodiment of the present disclosure may be implemented as a notebook computer, a tablet computer, a desktop computer, a set-top box or a mobile device (for example, a mobile phone, a portable music player, a personal digital assistant (PDA), a dedicated messaging device, or a portable game device), or another type of user terminal. The electronic device for vehicle-searching guidance provided in this embodiment of the present disclosure may be implemented as an in-vehicle terminal or may be implemented as a server.

Figure 3:
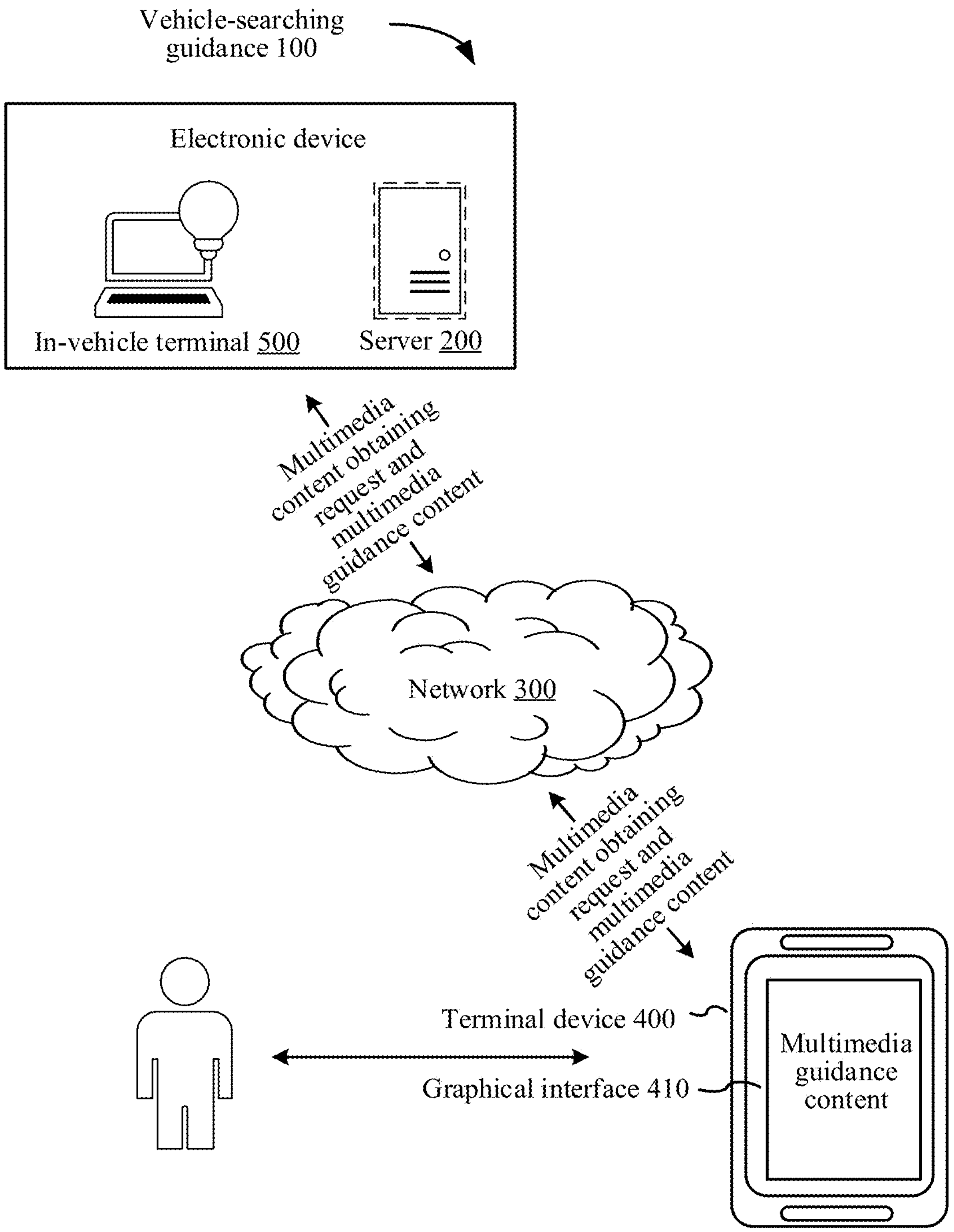
FIG. 3 is an example schematic architectural diagram of a vehicle-searching guidance system according to an embodiment of the present disclosure.

Referring to FIG. 3, FIG. 3 is an example schematic architectural diagram of a vehicle-searching guidance system according to an embodiment of the present disclosure. To support a vehicle-searching guidance application, in a vehicle-searching guidance system 100, a terminal device 400 is connected to a server 200 or an in-vehicle terminal 500 (which is an implementation of the electronic device) through a network 300. The network 300 may be a wide area network, a local area network, or a combination of the wide area network and the local area network.

The terminal device 400 displays a vehicle-searching guidance interface on a graphical interface 410 in response to a first trigger operation on a first control on the graphical interface 410, the vehicle-searching guidance interface being used for providing guidance information for vehicle searching. When detecting a second trigger operation on a second control on the vehicle-searching guidance interface, the terminal device 400 transmits a multimedia content obtaining request to the server 200 or the in-vehicle terminal 500 through the network 300 in response to the second trigger operation on the second control, and receives multimedia guidance content corresponding to the multimedia content obtaining request returned by the server 200 and the in-vehicle terminal 500, the multimedia guidance content recording environmental information of a parking space in which a vehicle is located, and the multimedia guidance content being obtained by an acquisition apparatus coupled to the vehicle. Finally, the terminal device 400 may guide, by playing the multimedia guidance content, a target object to search for the vehicle.

In one or more embodiments, the terminal device 400 may be connected to the in-vehicle terminal 500 or the server 200 through Bluetooth, Wi-Fi, a mobile network (such as a 5G network, a 4G network, and the like), near field communication (NFC), and the like, and then obtain the multimedia guidance content from the in-vehicle terminal 500 or the server 200.

It may be understood that, the terminal device 400 may determine whether to obtain the multimedia guidance content from the in-vehicle terminal 500 or the server 200 based on whether there being a connection established between the terminal device and the in-vehicle terminal 500. For example, the terminal device 400 may directly transmit the multimedia content obtaining request to the in-vehicle terminal 500 when the terminal device 400 establishes a connection to the in-vehicle terminal 500 through Bluetooth and NFC; and the terminal device 400 may transmit the multimedia content obtaining request to the server 200 through Wi-Fi or the mobile network when the terminal device 400 does not establish a connection to the in-vehicle terminal 500.

Environmental information of a parking route may include image information of a floor on which the parking space is located, image information of a route from an entrance of the parking lot to the parking space, image information of a landmark passed by the vehicle during traveling, image information of an indicator plate passed by, image information of a number of another parking space passed by, and the like. The environmental information of the parking space corresponding to the vehicle may include image information of a number of the parking space, image information of another vehicle parked around the parking space, and the like.

In one or more embodiments, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal device 400 may be a smartphone, a tablet computer, a notebook computer, a desktop computer, a smart speaker, a smartwatch, or the like, but is not limited thereto. The terminal device and the server may be directly or indirectly connected in a wired or wireless communication manner. This is not limited in this embodiment of the present disclosure.

Figure 4:
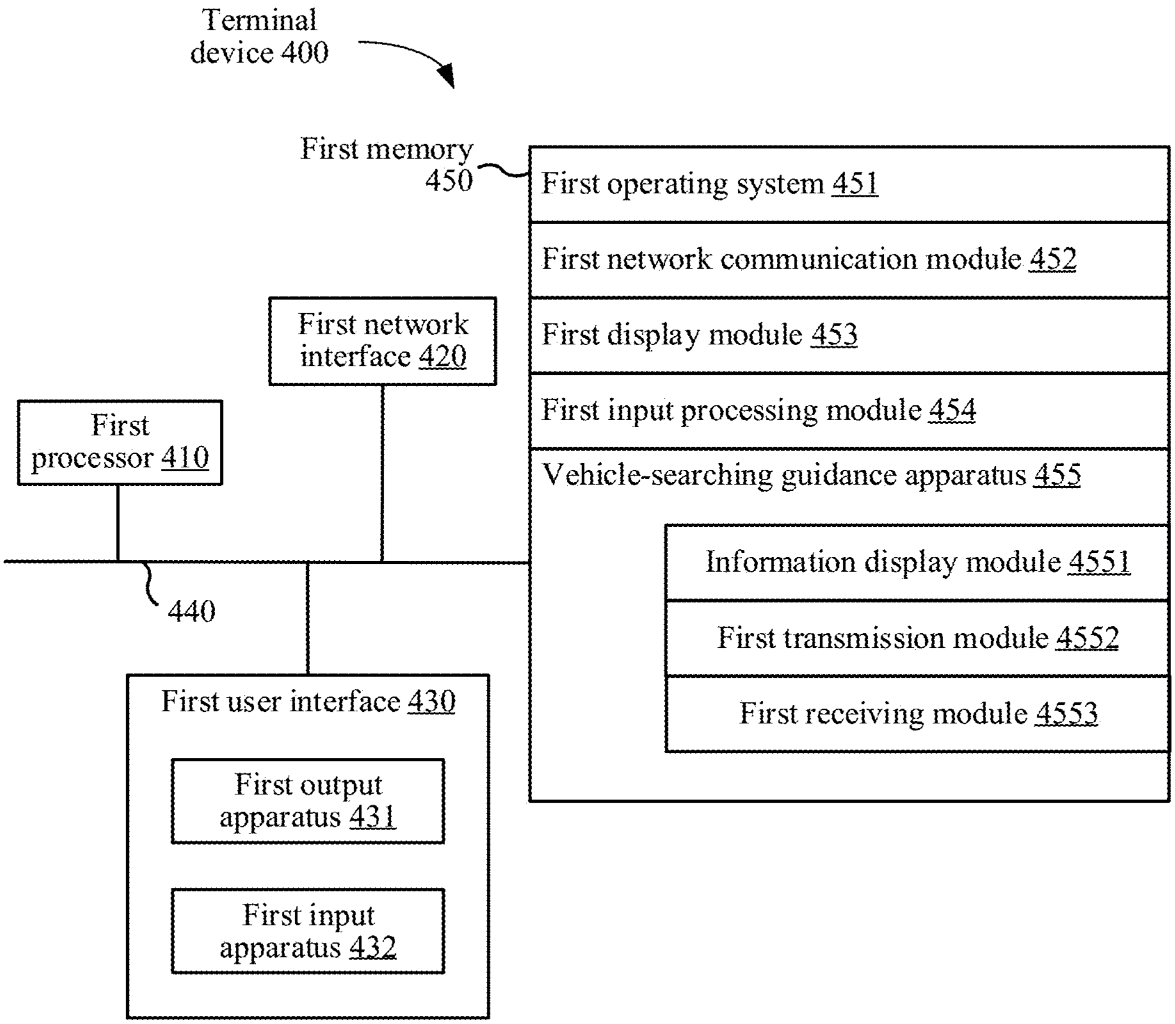
FIG. 4 is a schematic structural diagram of a terminal device in FIG. 3 according to an embodiment of the present disclosure.

Referring to FIG. 4, FIG. 4 is a schematic structural diagram of a terminal device in FIG. 3 according to an embodiment of the present disclosure. The terminal device 400 shown in FIG. 4 includes: at least one first processor 410, a first memory 450, at least one first network interface 420, and a first user interface 430. All components in the terminal device 400 are coupled together through a first bus system 440. It may be understood that the first bus system 440 is configured to implement connection and communication between the components. In addition to a data bus, the first bus system 440 further includes a power bus, a control bus, and a state signal bus. However, for ease of clear description, as shown in FIG. 4, all types of buses are labeled as the first bus system 440.

The first processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, or the like.

The first user interface 430 includes one or more first output apparatuses 431 that enable presentation of media content, including one or more speakers and/or one or more visualization displays. The first user interface 430 further includes one or more first input apparatuses 432, including user interface components helping a user input, such as a keyboard, a mouse, a microphone, a touch display screen, a camera, and other input buttons and controls.

The first memory 450 may be a removable memory, a non-removable memory, or a combination thereof. Exemplary hardware devices include a solid-state memory, a hard disk drive, an optical disc driver, or the like. In some embodiments, the first memory 450 includes one or more storage devices physically far away from the first processor 410.

The first memory 450 includes a volatile memory or a non-volatile memory, or may include both a volatile memory and a non-volatile memory. The non-volatile memory may be a read-only memory (ROM), and the volatile memory may be a random access memory (RAM). The first memory 450 described in this embodiment of the present disclosure is to include any other suitable type of memories.

In one or more embodiments, the first memory 450 may store data to support various operations. Examples of the data include programs (for example, executable instructions implementing a vehicle-searching guidance method on a terminal device side provided in this embodiment of the present disclosure), modules, and data structures, or a subset or a superset thereof. The descriptions are made below by using examples.

A first operating system 451 includes a system program configured to process various basic system services and perform a hardware-related task, for example, a framework layer, a core library layer, and a driver layer, and is configured to implement various basic services and process a hardware-related task.

A first network communication module 452 is configured to reach another computing device through one or more (wired or wireless) first network interfaces 420. Exemplarily, the first network interfaces 420 include: Bluetooth, wireless compatible authentication (Wi-Fi), a universal serial bus (USB), and the like.

A first display module 453 is configured to display information by using a first output apparatus 431 (for example, a display screen or a speaker) associated with one or more first user interfaces 430 (for example, a user interface configured to operate a peripheral device and display content and information).

A first input processing module 454 is configured to detect one or more user inputs or interactions from one of the one or more first input apparatuses 432 and translate the detected input or interaction.

In some embodiments, a vehicle-searching guidance apparatus 455 may be implemented in a form of software. FIG. 4 shows the vehicle-searching guidance apparatus 455 stored in the first memory 450, which may be software in a form such as a program and a plug-in, and includes the following software modules: an information display module 4551, a first transmission module 4552, and a first receiving module 4553. Such modules are logical, and therefore may be randomly combined or further divided according to a function to be implemented. A function of each module is described below.

Figure 5:
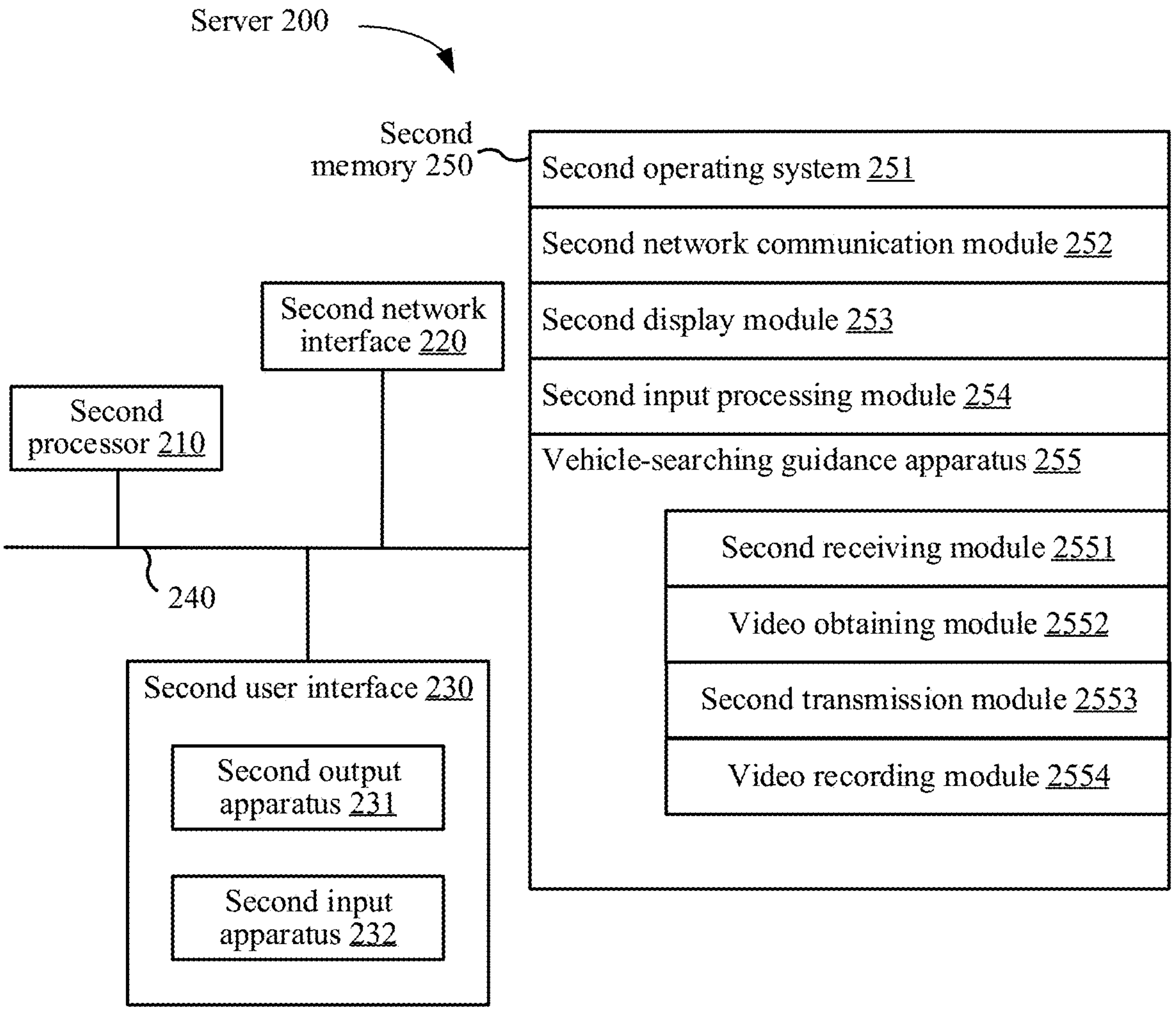
FIG. 5 is a schematic structural diagram of implementing an electronic device in FIG. 3 as a server according to an embodiment of the present disclosure.

Referring to FIG. 5, FIG. 5 is a schematic structural diagram of implementing an electronic device in FIG. 3 as a server according to an embodiment of the present disclosure. The server 200 shown in FIG. 5 includes: at least one second processor 210, a second memory 250, at least one second network interface 220, and a second user interface 230. Components in the server 200 are coupled together through a second bus system 240. It may be understood that the second bus system 240 is configured to implement connection and communication between the components. In addition to a data bus, the second bus system 240 further includes a power bus, a control bus, and a state signal bus. However, for ease of clear description, as shown in FIG. 5, all types of buses are labeled as the second bus system 240.

The second processor 210 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, or the like.

The implementation of the second user interface 230 is similar to the implementation of the first user interface 430. Details are not repeated herein again.

In some embodiments, the second memory 250 may store data to support various operations. Examples of the data include programs (for example, executable instructions implementing a vehicle-searching guidance method on an electronic device side provided in this embodiment of the present disclosure), modules, and data structures, or a subset or a superset thereof. The descriptions are made below by using examples.

The implementation of a second operating system 251 is similar to the implementation of the first operating system 451. Details are not repeated herein again.

The implementation of a second communication module 252 is similar to the implementation of the first communication module 452. Details are not repeated herein again.

The implementation of a second display module 253 is similar to the implementation of the first display module 453. Details are not repeated herein again.

The implementation of a second input processing module 254 is similar to the implementation of the first input processing module 454. Details are not repeated herein again.

In some embodiments, a vehicle-searching guidance apparatus 255 provided in this embodiment of the present disclosure may be implemented in a form of software. FIG. 5 shows the vehicle-searching guidance apparatus 255 stored in the second memory 250, which may be software in a form such as a program and a plug-in, and includes the following software modules: a second receiving module 2551, a video obtaining module 2552, a second transmission module 2553, and a video recording module 2554. Such modules are logical, and therefore may be randomly combined or further divided according to a function to be implemented. A function of each module is described below.

It may be understood that, the electronic device may be implemented as the in-vehicle terminal 500 in FIG. 3 or the server 200 in FIG. 3, and the structure of the in-vehicle terminal 500 in FIG. 3 is similar to the structure of the server 200 in FIG. 3. Details are not repeated herein again.

The vehicle-searching guidance method provided in this embodiment of the present disclosure is described below with reference to exemplary applications and implementations of the terminal device and the electronic device provided in this embodiment of the present disclosure.

Figure 6:
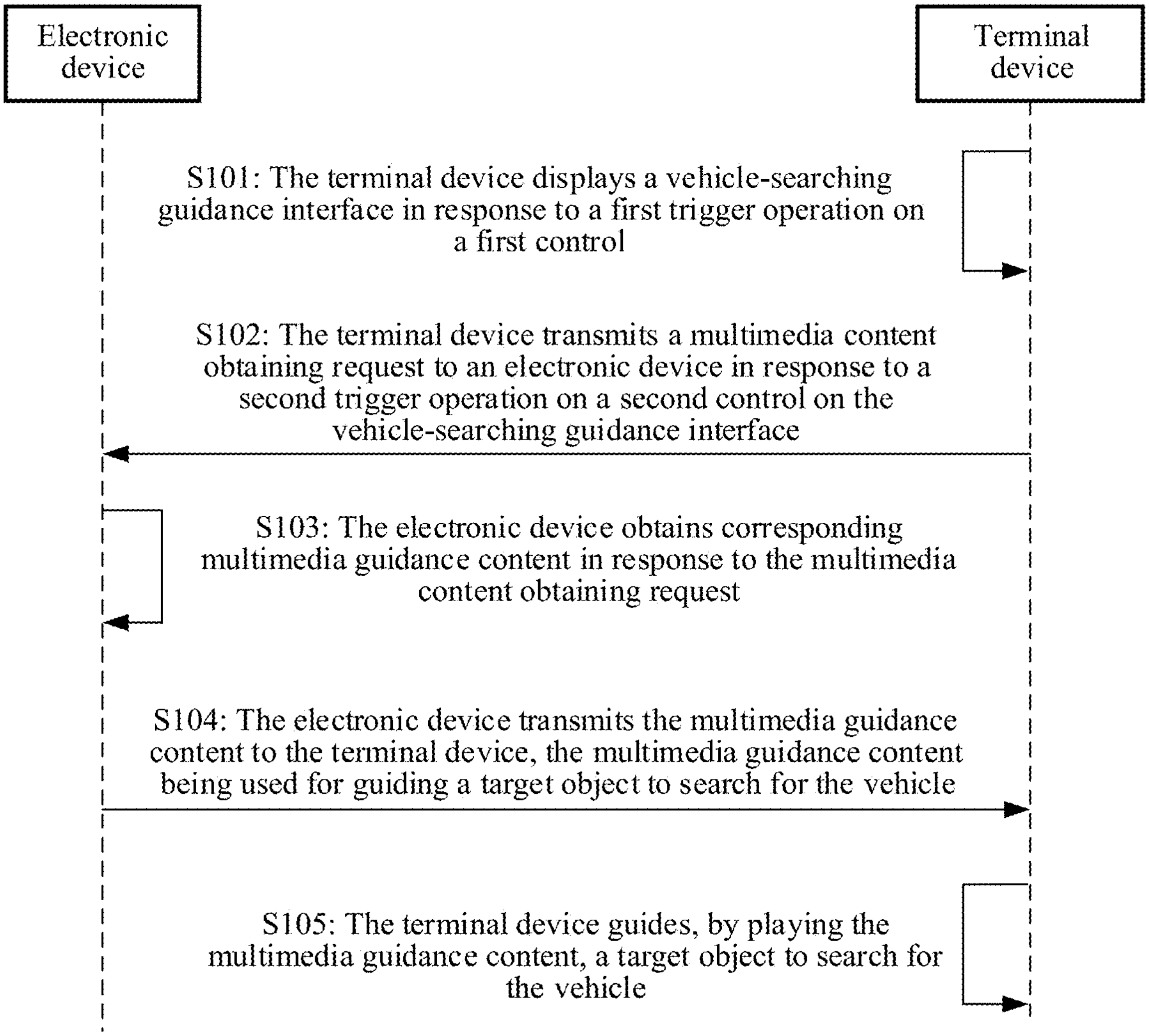
FIG. 6 is an example schematic flowchart of a vehicle-searching guidance method according to an embodiment of the present disclosure.

Referring to FIG. 6, FIG. 6 is an example schematic flowchart of a vehicle-searching guidance method according to an embodiment of the present disclosure, and the method is described with reference to steps shown in FIG. 6.

S101: A terminal device displays a vehicle-searching guidance interface in response to a first trigger operation on a first control.

The vehicle-searching guidance method provided in this embodiment of the present disclosure is implemented in a scenario in which a target object need to drive out of a parking lot after parking a vehicle in the parking lot. The target object may be a user. For example, a scenario in which the target object parks the vehicle in an underground parking lot of a shopping mall, after shopping, the target object needs to find a parking space in which the vehicle is parked, and drives out of the shopping mall, or a scenario in which the target object drives into a ground parking lot of a high-speed service area, and when leaving the service area, the target object needs to search for a parking space in which the vehicle is parked. The terminal device detects whether the target object performs the first trigger operation on the first control to determine whether the target object has requirements for obtaining guidance information for vehicle searching. When detecting the first trigger operation on the first control by the target object, the terminal device confirms that the target object has requirements for obtaining the guidance information for vehicle searching, creates a vehicle-searching guidance interface in response to the first trigger operation on the first control, and displays the vehicle-searching guidance interface on a display interface of the terminal device, so that the target object obtains the guidance information for vehicle searching. That is, the vehicle-searching guidance interface is used for providing guidance information for vehicle searching. The target object may be a user currently searching for a vehicle, or may be a smart robot that helps the user search for the vehicle, or the like.

In one or more embodiments, the first control may be configured on a parking lot information interface, so that the target object triggers the first control on the parking lot information interface after the terminal device enters the parking lot information interface. The parking lot information interface may be entered when the target object scans a parking lot information two-dimensional code, a parking lot information barcode, and the like in a parking lot during vehicle searching, or may be entered by the target object by directly searching a name of the parking lot on a search engine of the terminal device, or may be matched and entered by the terminal device according to a current geographic location of the target object. This is not limited herein.

In one or more embodiments, the parking lot information interface may provide basic information about the parking lot, for example, a name of the parking lot, a geographic location of the parking lot, opening hours of the parking lot, a charging standard of the parking lot, and the like. The parking lot information interface may further include information related to the target object (where the parking lot information interface may be bound to identity information of the target object in this case), for example, a park duration of the target object, a time that the target object enters the parking lot, a fee to be paid, and the like.

In one or more embodiments, the first control may be configured in a first region on the parking lot information interface, where an area and position of the first region may be set according to an actual condition. For example, the first region is arranged at the bottom of the parking lot information interface with an area of 100×50, or the first region is arranged at an upper right corner of the parking lot information interface with an area of 50×50. This is not limited in this embodiment of the present disclosure.

Figure 7:
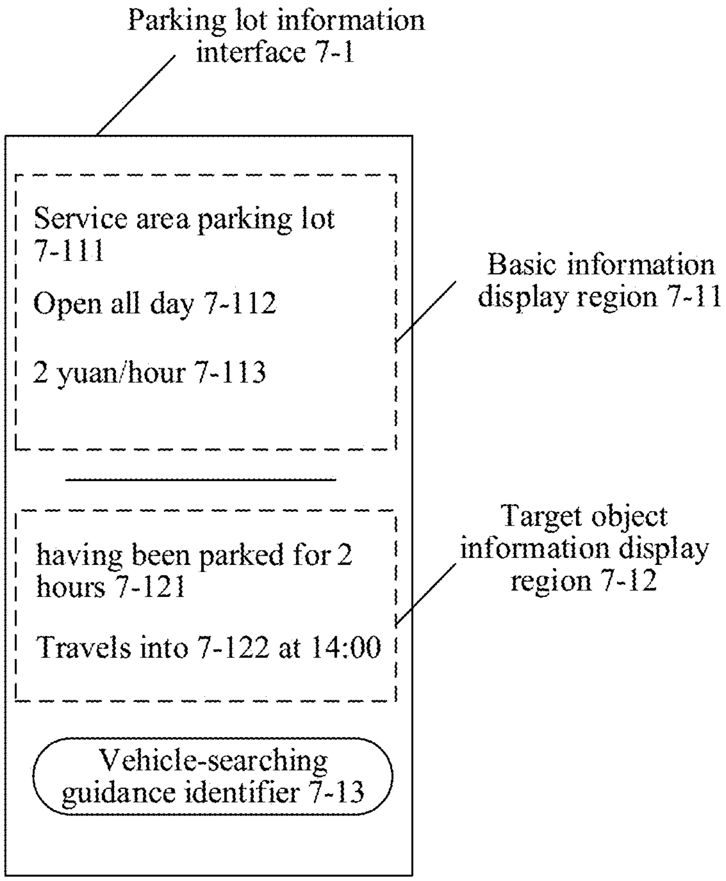
FIG. 7 is a schematic diagram of a parking lot information interface according to an embodiment of the present disclosure.

Exemplarily, FIG. 7 is a schematic diagram of a parking lot information interface according to an embodiment of the present disclosure. Referring to FIG. 7, a basic information display region 7-11 and a target object information display region 7-12 are arranged on a parking lot information interface 7-1. The basic information display region 7-11 displays basic information of the parking lot, that is, the name of the parking lot: a service area parking lot 7-111, opening hours of the parking lot: open all day 7-112, and a charging standard of the parking lot: 2 yuan/hour 7-113. The target object information display region 7-12 displays the park duration of the target object: the vehicle has been parked for 2 hours 7-121, and the time that the vehicle enters the parking lot: entering at 14:00 7-122. The first control, that is, a vehicle-searching guidance identifier 7-13, is configured in the middle of the bottom of the parking lot information interface 7-1, and the target object may enter the vehicle-searching guidance interface by clicking/taping the vehicle-searching guidance identifier 7-13.

In one or more embodiments, the first trigger operation may be an operation such as clicking, double-clicking, and the like, or may be an operation such as long press, sliding, and the like. This is not limited herein.

In one or more embodiments, the vehicle-searching guidance interface may include a graphic text information display region and a video playback region. The graphic text information display region is used for providing guidance information in a form of graphic text to the target object, for example, information such as a number of a parking space in which a vehicle of the target object is parked, an orientation of the parking space corresponding to the parking lot, a picture of a surrounding environment of the parking space, and the like. The video playback region may provide guidance information in a form of videos to the target object.

In one or more embodiments, the graphic text information display region may be arranged in a second region on the vehicle-searching guidance interface, and the video playback region may be arranged in a third region on the vehicle-searching guidance interface. Areas and positions of the second region and the third region may be set according to an actual condition. This is not limited herein.

For example, the second region is arranged in the upper half of the vehicle-searching guidance interface, the third region is arranged in the lower half of the vehicle-searching guidance interface, widths of the second region and the third region are both set to a width of the vehicle-searching guidance interface, and heights of the second region and the third region are both set to half a height of the vehicle-searching guidance interface. Alternatively, the second region is arranged in the left half of the vehicle-searching guidance interface, the third region is arranged in the right half of the vehicle-searching guidance interface, widths of the second region and the third region are both set to half a width of the vehicle-searching guidance interface, and heights of the second region and the third region are both set to a height of the vehicle-searching guidance interface.

Figure 8:
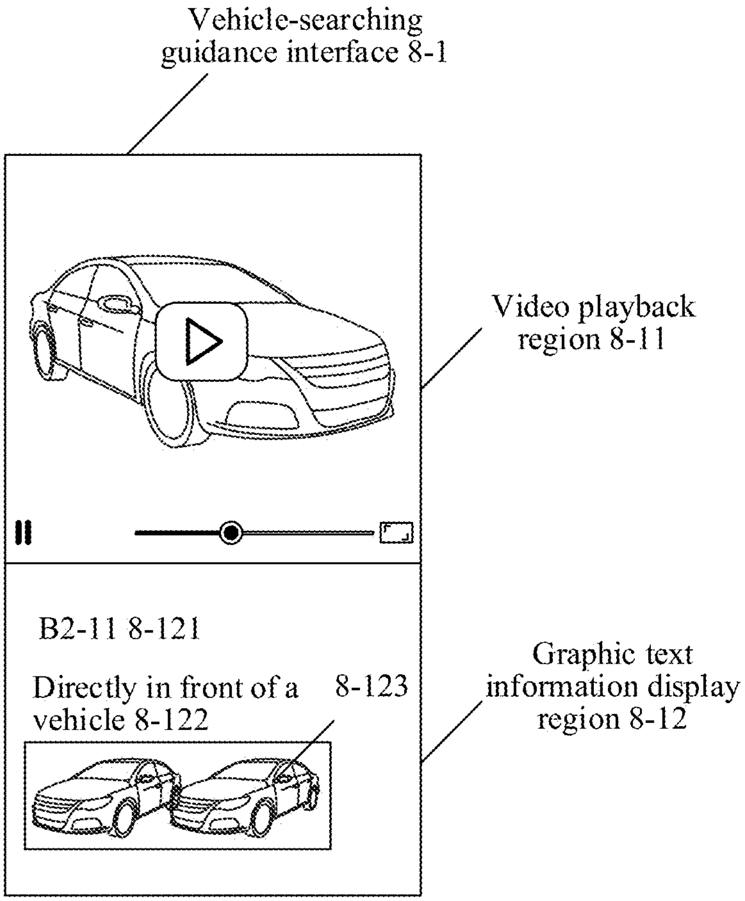
FIG. 8 is a schematic diagram of a vehicle-searching guidance interface according to an embodiment of the present disclosure.

FIG. 8 is a schematic diagram of a vehicle-searching guidance interface according to an embodiment of the present disclosure. Referring to FIG. 8, a video playback region 8-11 and a graphic text information display region 8-12 are arranged on a vehicle-searching guidance interface 8-1. The video playback region 8-11 is used for playing a video guiding the target object to perform reverse vehicle searching. The graphic text information display region 8-12 displays guidance information of graphic text: a parking space number: B2-11 8-121, a parking space orientation: directly in front of an elevator 8-122, and a picture of a surrounding environment of the parking space 8-123.

S102: The terminal device transmits a multimedia content obtaining request to an electronic device in response to a second trigger operation on a second control on the vehicle-searching guidance interface.

The second control is configured on the vehicle-searching guidance interface. When the target object performs a trigger operation on the second control, the trigger operation is the second trigger operation, so that the terminal device may determine that the target object has requirements for searching for a parking space based on multimedia guidance content, generate a multimedia content obtaining request in response to the second trigger operation, and transmit the multimedia content obtaining request to the electronic device. The electronic device receives the multimedia content obtaining request transmitted by the terminal device.

In one or more embodiments, the second control may be a button on the vehicle-searching guidance interface for triggering obtaining of the guidance content, for example, a "obtain guidance content" button, a "obtain a route of parking" button, or may be a link for triggering obtaining of the guidance content.

In some embodiments, the electronic device may be implemented as the in-vehicle terminal. In some other embodiments, the electronic device may be implemented as the server. The terminal device may transmit the multimedia content obtaining request to the in-vehicle terminal or the server through Bluetooth, near field communication (NFC), Wi-Fi, and the like. The terminal device may transmit the multimedia content obtaining request to the server through a mobile network such as 5G and 4G networks.

S103: The electronic device obtains corresponding multimedia guidance content in response to the multimedia content obtaining request.

After receiving the multimedia content obtaining request, the electronic device may obtain, in response to the received multimedia content obtaining request, the multimedia guidance content acquired during parking of the vehicle, to subsequently provide the multimedia guidance content to the target object.

The multimedia guidance content includes environmental information of a parking space in which a vehicle is parked, and the multimedia guidance content is obtained based on an acquisition apparatus coupled to the vehicle. The acquisition apparatus may be an in-vehicle acquisition apparatus or other apparatus suitable for obtaining/recording the multimedia guidance content. In some embodiments, the multimedia guidance content may include diversified environmental information and may further include temporal information, so that the environmental information can form into a sequence in a time dimension, the target object may determine a sequence of various events, conditions around the parking space can be better recorded according to the multimedia guidance content, and the target object may fine the vehicle according to such conditions.

In one or more embodiments, the multimedia guidance content may be consecutive images including environmental information around the parking space, or may be a video including environmental information around the parking space. This is not limited herein.

In some embodiments, the electronic device may directly use the consecutive images or video including the environmental information around the parking space as the multimedia guidance content, or may first remove redundant information from the consecutive images or video including the environmental information around the parking space, and update an obtained key route video or key route image set to the multimedia guidance content. The redundant information may include duplicate landmark images, duplicate environmental information of the parking space, and the like.

S104: The electronic device transmits the multimedia guidance content to the terminal device, the multimedia guidance content being used for guiding a target object to search for the vehicle.

The electronic device delivers the multimedia guidance content to the terminal device, so that the terminal device can display the multimedia guidance content. The terminal device receives the multimedia guidance content after transmitting the multimedia content obtaining request, and therefore, the terminal device receives the multimedia guidance content corresponding to the multimedia content obtaining request returned by the electronic device.

In one or more embodiments, when it is necessary for the electronic device to acquire the multimedia guidance content, the electronic device may be implemented as the in-vehicle terminal, that is, the in-vehicle terminal invokes the in-vehicle acquisition apparatus to acquire the multimedia guidance content, and transmit the multimedia guidance content to the terminal device. When it is necessary for the electronic device to generate a key route video or key route image set, and update the generated key route video or key route image set to the multimedia guidance content, the electronic device may be implemented as the in-vehicle terminal, or may be implemented as the server, that is, the multimedia guidance content may be redundantly updated through the in-vehicle terminal or the server, and then the in-vehicle terminal or the server transmits the updated multimedia guidance content to the terminal device. In one or more embodiments, the multimedia guidance content of the server may be received from an in-vehicle terminal side when the electronic device is implemented as the server.

S105: The terminal device guides, by playing the multimedia guidance content, a target object to search for the vehicle. In other words, the terminal device presents the multimedia guidance content for a user to search for the vehicle.

The terminal device plays the multimedia guidance content in a form of a video in the video playback region on the vehicle-searching guidance interface, or displays the multimedia guidance content in the graphic text information display region on the vehicle-searching guidance interface, that is, statically plays the multimedia guidance content in a form of graphic text, to display conditions around the parking space to the target object based on rich image information, facilitate the target object to move to the parking space in which the vehicle is parked by walking or another manner, and implement a process of searching for the vehicle by the target object, thereby saving a time for the target object to find the vehicle.

In some other embodiments, an adjustment identifier is further provided in the video playback region. The terminal device may zoom in the size of the video playback region to a full screen when the target object triggers the adjustment identifier, to play a parking route video in a full-screen manner, so that the target object may obtain detailed information. The terminal device may also continue to receive a zoom operation by the target object when the target object triggers the adjustment identifier, to adjust the size of the video playback region by a zooming ratio, so that the target object may adjust the video playback region.

Figure 9:
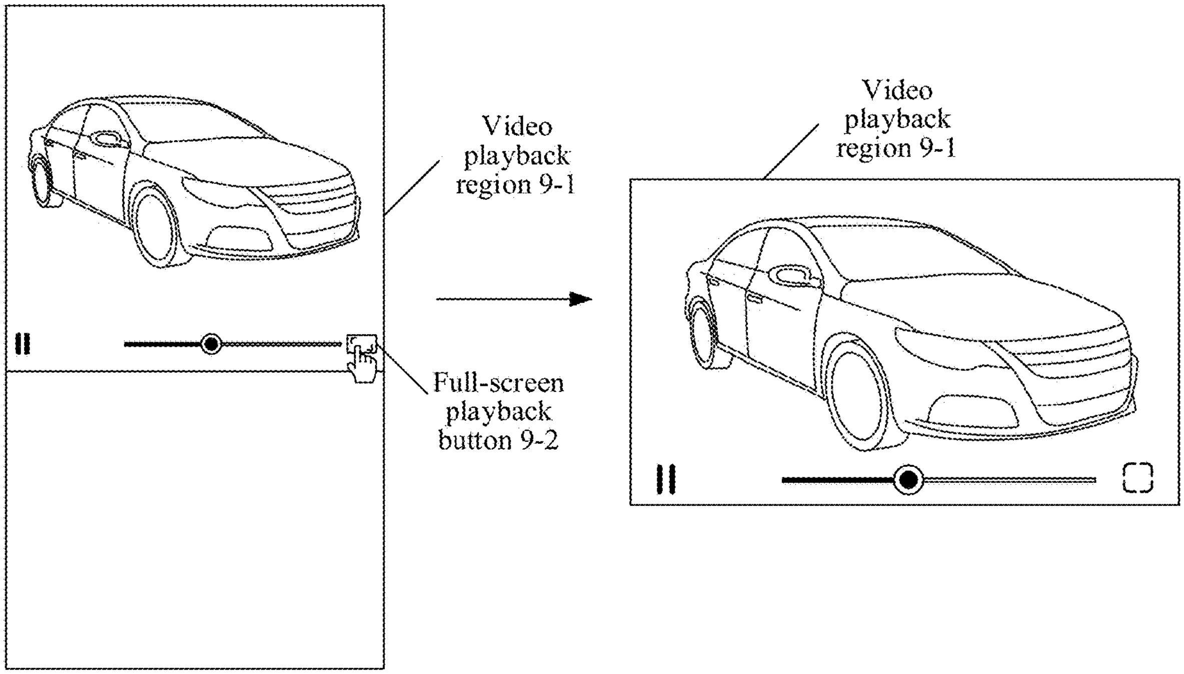
FIG. 9 is a schematic diagram of playing multimedia guidance content according to an embodiment of the present disclosure.

FIG. 9 is a schematic diagram of playing multimedia guidance content according to an embodiment of the present disclosure. As shown in FIG. 9, the terminal device plays the multimedia guidance content in a video playback region 9-1. However, a relatively small area of the video playback region 9-1 makes it inconvenient for the target object to watch. At a lower right corner of the video playback region 9-1, a full-screen playback button 9-2 (the adjustment identifier) is configured. A full-screen playback mode may be entered when the target object clicks the button. In this case, the video playback region 9-1 occupies an entire display interface of the terminal device.

In this embodiment of the present disclosure, when detecting a second trigger operation on a second control on a vehicle-searching guidance interface, a terminal device may determine that a target object has requirements for guiding reverse vehicle searching through multimedia guidance content, transmits a multimedia content obtaining request, receives returned multimedia guidance content that records environmental information of a parking space, and displays the multimedia guidance content, so that environmental details of the parking space are provided to the target object through the multimedia guidance content, thereby increasing information provided to the target object during vehicle-searching guidance, shortening a time for the target object to search for a parking space in which a vehicle is parked, and improving the vehicle searching efficiency.

In some embodiments, when acquiring the environmental information of the parking route, the in-vehicle acquisition apparatus is likely to capture a payment code pasted on a wall or a column of the parking lot. Therefore, the multimedia guidance content includes a payment code video frame, and the payment code in the payment code video frame is used as the third control. After playing the multimedia guidance content in the playback region by the terminal device, that is, after S105, the method may further include: S106, which is as follows:

S106: The terminal device displays a payment page in response to a trigger operation on a third control. The payment page is used for the target object to pay a parking fee.

In one or more embodiments, there is no toll worker arranged in the parking lot, and the parking fee is charged through the payment code, that is, the third control. The parking space in which the vehicle of the target object is parked may be far from the payment code, causing inconvenience for the target object to pay the parking fee. Therefore, in one or more embodiments, when the multimedia guidance content includes the payment code video frame, after detecting a trigger operation by the target object on the payment code, that is, the third control in the payment code video frame, the terminal device may generate and display the payment page in response to the trigger operation, so that the target object can pay the parking fee through the payment page.

In one or more embodiments, the trigger operation on the third control may be a double-click operation by the target object, a long press operation by the target object, or another operation that can achieve the same effect. This is not limited in this embodiment of the present disclosure.

In one or more embodiments, the payment code may be a two-dimensional code, a barcode, or a graphic code in another form. This is not specifically limited in this embodiment of the present disclosure.

Figure 10:
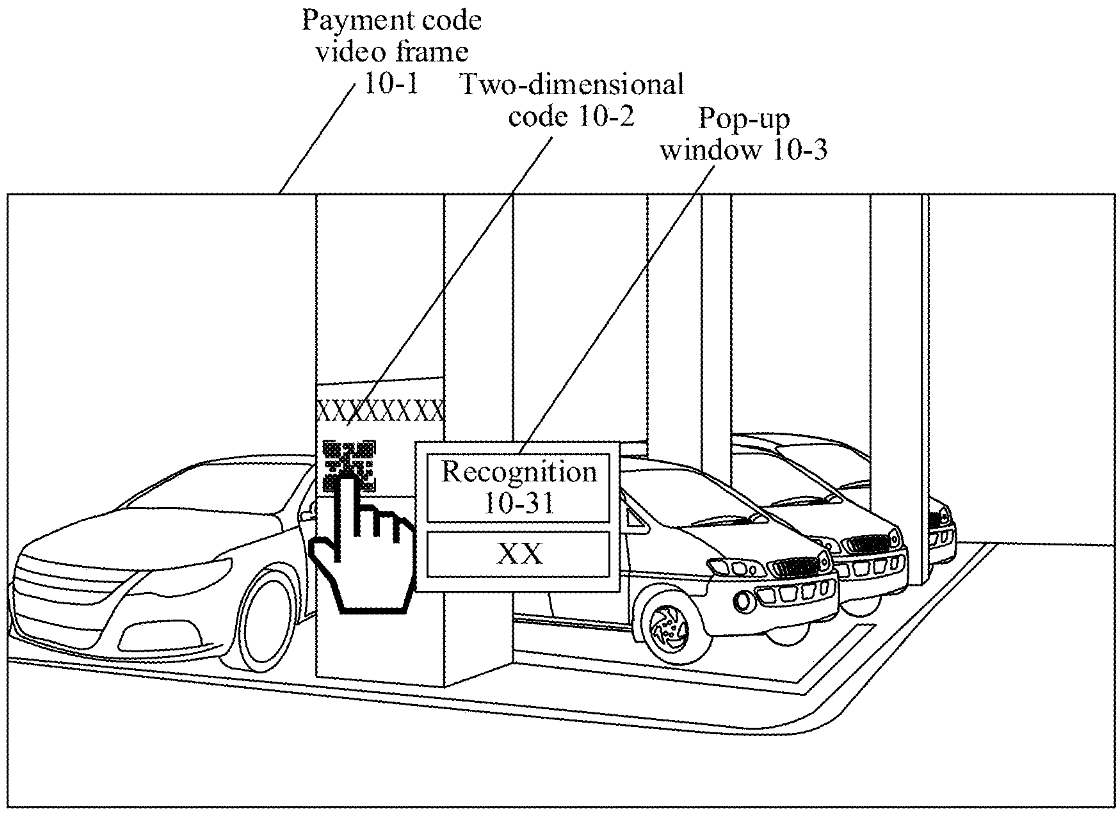
FIG. 10 is a schematic diagram of receiving a trigger operation on a third control according to an embodiment of the present disclosure.

FIG. 10 is a schematic diagram of receiving a trigger operation on a third control according to an embodiment of the present disclosure. Referring to FIG. 10, the payment code is a two-dimensional code pasted on the column. The terminal device may first receive the long press operation by the target object on a region of a two-dimensional code 10-2 (the third control) in a payment code video frame 10-1, and then shows a pop-up window 10-3 around the two-dimensional code 10-2, a recognition 10-31 button for the two-dimensional code being configured on the pop-up window, and a payment interface may be jumped to when the terminal device receives a trigger operation on the recognition button by the target object.

In this embodiment of the present disclosure, the multimedia guidance content includes the payment code video frame, and the terminal device may display the payment page when detecting the trigger operation by the target object on the third control in the payment code video frame, thereby implementing a process of helping the target object pay the parking fee based on the multimedia guidance content, shortening a time for the target object to search for the payment code, and improving convenience of the target object to pay the parking fee.

In some embodiments, the multimedia guidance content further records the environmental information of the parking route, the parking route represents a route of the vehicle from start of traveling into the parking lot to stop of traveling. The multimedia guidance content corresponds to a progress bar, and the progress bar corresponding to the multimedia guidance content displays a progress prompt identifier. In this case, the terminal device guides, by playing the multimedia guidance content, a target object to search for the vehicle, that is, in some embodiments, S105 may include: S1051, which is as follows:

S1051: The terminal device jumps to a key frame corresponding to the progress prompt identifier in response to a trigger operation on the progress prompt identifier, and start playing the multimedia guidance content from the key frame corresponding to the progress prompt identifier, to guide the target object to search for the vehicle.

The time of the target object is limited. In addition, key guidance information that provides vehicle searching clues for the target object is also limited. In view of this, the progress prompt identifier of the key guidance information can prompt the target object to focus on which content of the multimedia guidance content, thereby saving the time for the target object to find the vehicle. In some embodiments, the terminal device may detect a trigger operation by the target object on the progress bar of the multimedia guidance content, to determine, through the trigger operation, whether the target object adjusts a playback progress of the multimedia guidance content. When detecting the trigger operation by the target object on the progress prompt identifier of the progress bar, the terminal device determines that the target object needs to skip some less important guidance content and directly obtain key guidance information from the multimedia guidance content. In this case, in response to the trigger operation, the terminal device may directly jump to a key frame corresponding to the progress prompt identifier from a current video frame played by the multimedia guidance content. The key frame contains key guidance information, and the key guidance information is extracted based on the environmental information of the parking route and the environmental information of the parking space. After jumping from the current video frame to the key frame, the terminal device may continue to play the multimedia guidance content from the key frame until the multimedia guidance content is played to the end.

The terminal device starts playing the video from the key frame when the multimedia guidance content is in a form of a video, to realize the playback of the multimedia guidance content; and the terminal device may realize the playback of the multimedia guidance content in a static display manner when the multimedia guidance content is in a form of an image or graphic text.

In one or more embodiments, the key guidance information may include at least one of number information of the parking space, information about a landmark passed by the parking route, information about a floor on which the parking space is located, a payment code, appearance information of another vehicle adjacent to the vehicle, environmental information directly in front of the parking space, or a surround view image of the parking space.

The surround image of the parking space may be captured by the surround view camera on the vehicle body. In some embodiments, the electronic device may also synthesize a top view image of the parking space based on the images captured by the surround view camera, and use the top view image of the parking space as the key guidance information.

In some embodiments, the key frame may also include one or more images or video frames, this is because the key guidance information is likely to be dispersed in different video frames or images. In this case, each video frame or image in the key frame may have a corresponding progress prompt identifier, so that the target object may quickly jump the playback progress to such video frames or images.

Figure 11A:
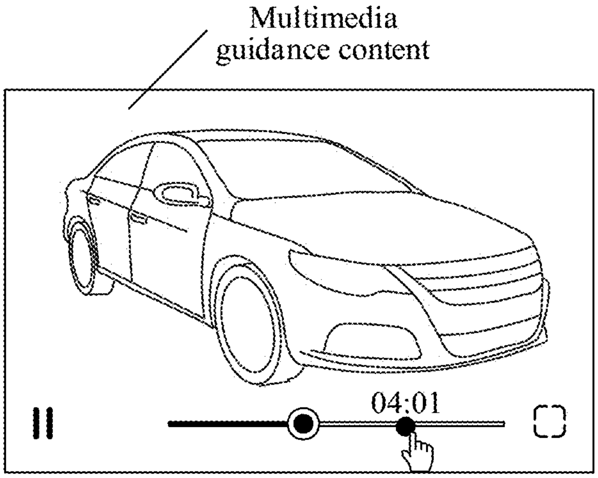
FIG. 11A is a schematic diagram of a progress prompt identifier according to an embodiment of the present disclosure.

FIG. 11A is a schematic diagram of a progress prompt identifier according to an embodiment of the present disclosure. As shown in FIG. 11A, the multimedia guidance content corresponds to a progress bar. At 04:01 of the progress bar, the progress prompt identifier of the key guidance information is set in a form of a solid point. When the target object clicks on the identifier, the terminal device may continue to play the multimedia guidance content from 04:01.

Figure 11B:
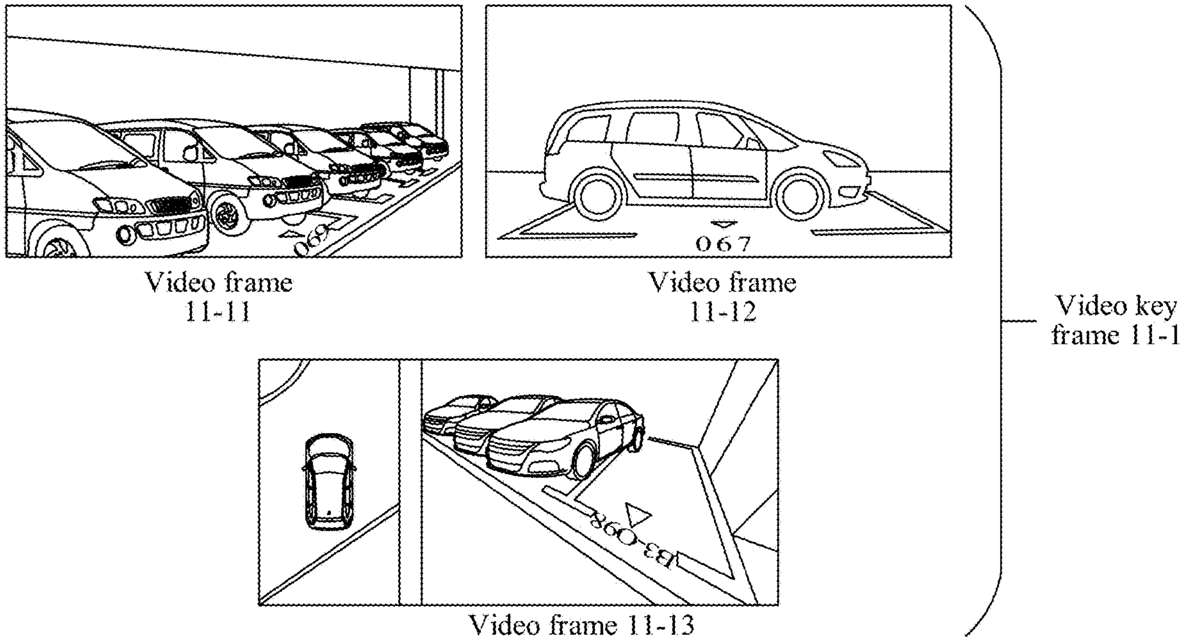
FIG. 11B is a schematic diagram of a key frame according to an embodiment of the present disclosure.

FIG. 11B is a schematic diagram of a key frame according to an embodiment of the present disclosure. Referring to FIG. 11B, the key frame includes a video frame of appearance information of other vehicles adjacent to the vehicle of the target object, that is, a video frame 11-11, a video frame of environmental information directly in front of the parking space, that is, a video frame 11-12, and a video frame of a surround view image of the parking space and a top view image of the parking space, that is, a video frame 11-13, and such video frames jointly form a key frame 11-1.

In some embodiments, to make the key guidance information in the key frame more conspicuous, the terminal device may add some enhancement effects to the key guidance information in the key frame, thereby making the key guidance information more conspicuous and prominent. That is, the vehicle-searching guidance method on a terminal device side provided in this embodiment of the present disclosure may further include:

S1051A: The terminal device displays an enhancement effect on the key guidance information when the multimedia guidance content is played from the key frame corresponding to the progress prompt identifier, the enhancement effect may include all effects that can make the key guidance information more conspicuous. The enhancement effect includes at least one of an arrow, an annotation box, a star effect, or a blinking effect.

Figure 12:
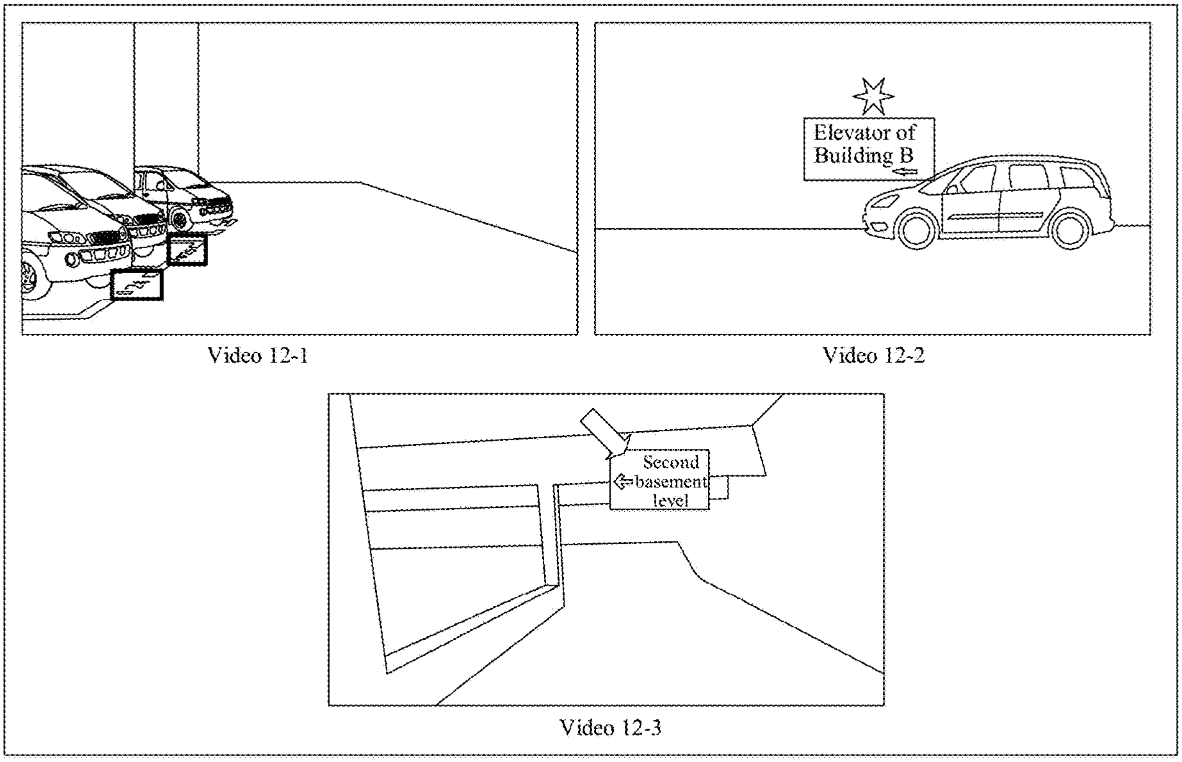
FIG. 12 is a schematic diagram of an enhancement effect on key guidance information according to an embodiment of the present disclosure.

FIG. 12 is a schematic diagram of an enhancement effect on key guidance information according to an embodiment of the present disclosure. As shown in FIG. 12, in a video frame 12-1, the key guidance information is a number of the parking space, and the terminal device may annotate the number of the parking space with an annotation box, thereby making the number more conspicuous. In a video frame 12-2, the key guidance information is a landmark, that is, an indicator identifier of an elevator in Building B, and the terminal device may add a star effect to the indicator identifier, so that the indication identifier is more prominent in the key video frame. In a video frame 12-3, the key guidance information is information about a floor on which the parking space is located, that is, a second basement floor, so that the terminal device may add an arrow pointing to the floor information around the floor information to highlight the floor information.

In this embodiment of the present disclosure, when detecting a trigger operation by the target object on a progress prompt identifier in a progress bar of multimedia guidance content including the environmental information of the parking route, the terminal device may directly jumps from the current playing video frame to the key frame including the key guidance information, and continue to play the multimedia guidance content from the key frame, thereby reducing a time for the target object to obtain the key guidance information, and continuing to improve the efficiency of finding the vehicle.

Figure 13:
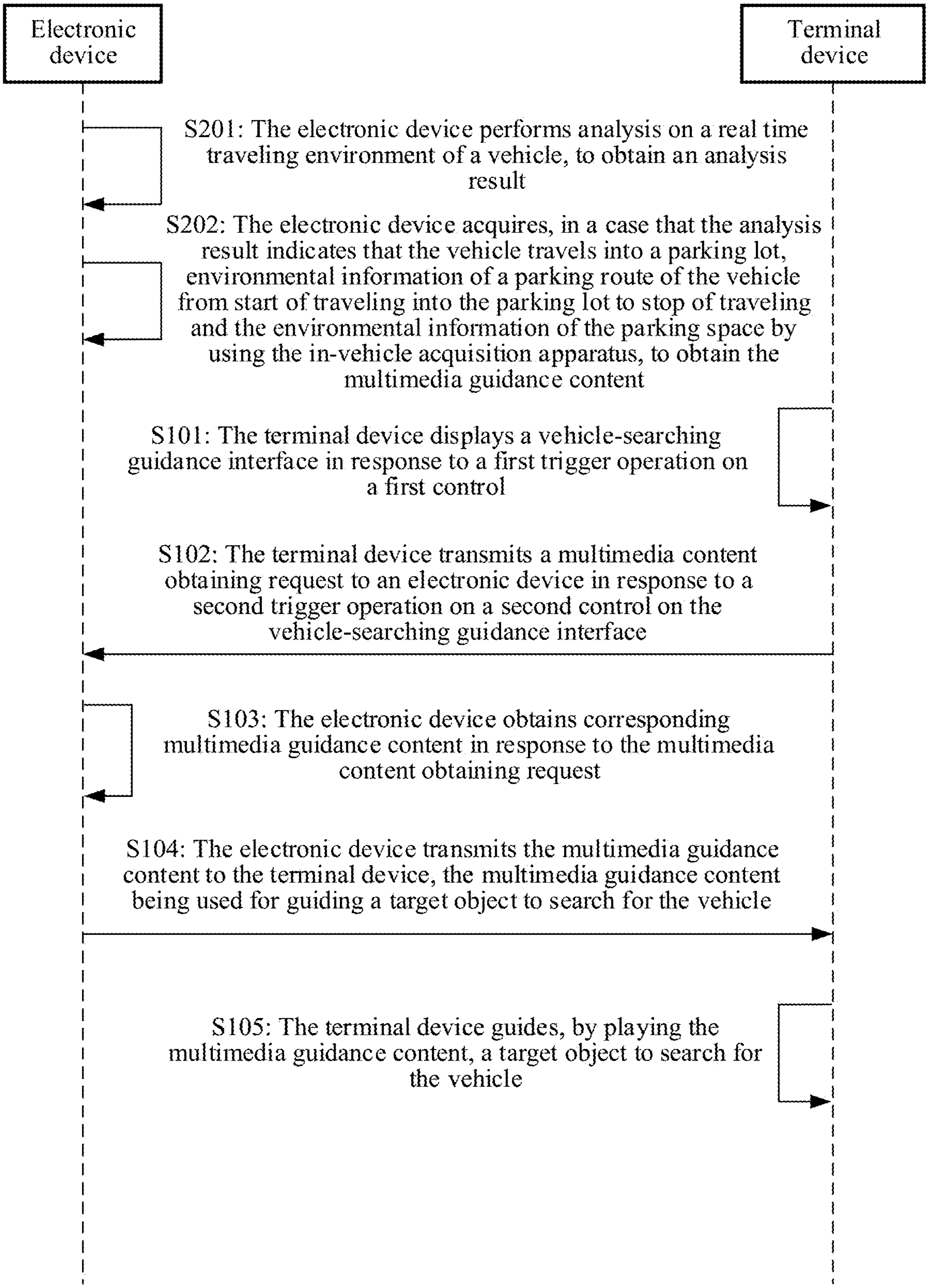
FIG. 13 is another example schematic flowchart of a vehicle-searching guidance method according to an embodiment of the present disclosure.

Referring to FIG. 13, FIG. 13 is another example schematic flowchart of a vehicle-searching guidance method according to an embodiment of the present disclosure. In some embodiments, the multimedia guidance content further records the environmental information of the parking route, and the electronic device can invoke the in-vehicle acquisition apparatus to acquire videos or images of the environmental information of the parking route. In this way, before the terminal device displays the vehicle-searching guidance interface in response to the first trigger operation on the first control and before the electronic device receives the multimedia content obtaining request transmitted by the terminal device, the method may further include S201 and S202.

S201: The electronic device performs analysis on a real time traveling environment of the vehicle, to obtain an analysis result.

In one or more embodiments, the electronic device continuously analyzes the real time traveling environment of the vehicle when the vehicle is in a traveling state, to determine whether the target object has entered the parking lot, thereby obtaining the analysis result. That is, in this embodiment of the present disclosure, the analysis result represents whether the vehicle travels into the parking lot.

In some embodiments, the electronic device may capture image information or a video of the real time traveling environment of the vehicle through the in-vehicle acquisition apparatus, and recognize the captured image or video to determine whether the vehicle has entered the parking lot. In some other embodiments, the electronic device may obtain real time position information of the vehicle through the positioning device, and then determine whether the vehicle has entered the parking lot with reference to the real time location information of the vehicle and location information of a geo-fence of the parking lot on a digital map.

In addition, in some embodiments, the electronic device may also determine whether the vehicle enters the parking lot through the voice, gestures, and other information of the target object. For example, the electronic device may determine that the vehicle has entered the parking lot by receiving the statement "Enter the parking lot, start recording" from the target object, or detect a significant change in light intensity, for example, light suddenly darkens, to determine that the vehicle has entered the parking lot.

S202: The electronic device acquires, when the analysis result indicates that the vehicle travels into a parking lot, environmental information of a parking route of the vehicle from start of traveling into the parking lot to stop of traveling and the environmental information of the parking space by using the in-vehicle acquisition apparatus, to obtain the multimedia guidance content.

When determining that the vehicle has entered the parking lot, the electronic device may invoke the in-vehicle acquisition apparatus to acquire, through the in-vehicle acquisition apparatus, environmental information of a route from start of entering the parking lot to stop of traveling, and acquire the environmental information of the parking space in which the vehicle is parked until it is determined that the vehicle parks according to sensor data of the vehicle, to obtain the multimedia guidance content. The environmental information intuitively represents locations travels by the vehicle during parking and a real situation of the parking space. The target object can undoubtedly understand a route and locations of the parking route and conditions around the parking space from the environmental information, to facilitate subsequent target objects to find parked vehicles.

In one or more embodiments, the electronic device may determine whether the vehicle has completely stopped traveling by combining an angular velocity obtained by an angular velocity sensor with an acceleration obtained by an acceleration sensor in an inertial measurement unit (IMU). The electronic device may also determine whether the vehicle has completely stopped traveling according to a wheel speed measured by a wheel speed sensor of the vehicle. The electronic device may also determine, through a detection network, a stationary condition of the image captured by the in-vehicle acquisition apparatus, and determine whether the vehicle has completely stopped traveling. The electronic device may also determine whether the vehicle has completely stopped traveling based on whether a fire signal of the vehicle being received or not.

In some embodiments, the in-vehicle acquisition apparatus includes a front-facing camera mounted on the driving recorder, and may also include a surround view camera mounted on the vehicle body. Electronic devices may simultaneously invoke the front-facing camera and the surround view camera to capture the multimedia guidance content, and may also capture the multimedia guidance content only through either of the front-facing camera or the surround view camera. This is not limited herein. It may be understood that, the surround view camera may start acquiring the multimedia guidance content only after the target object is manually turned on. This is not limited in this embodiment of the present disclosure.

In one or more embodiments, the electronic device may also adjust shooting parameters of the in-vehicle acquisition apparatus according to the environment of the parking lot when acquiring the environmental information of the parking route and the environmental information of the parking space through the in-vehicle acquisition apparatus, thereby improving quality of the multimedia guidance content.

For example, when the electronic device determines that the vehicle entered an underground parking lot (which may be changed with light and the slope of a road during traveling of the vehicle), the shooting parameters such as an aperture, photosensitivity, and the like of the in-vehicle acquisition apparatus may be raised, a shutter may be lowered, for example, the shooting parameters such as the aperture, photosensitivity, and the like are adjusted to be greater than a numerical threshold, and the shutter may be adjusted to be less than the numerical threshold, to ensure the quality of the multimedia guidance content. In another example, the aperture, photosensitivity, and shutter of the in-vehicle acquisition apparatus may not be adjusted when the electronic device determines that the vehicle has entered the underground parking lot.

Certainly, in some embodiments, the electronic device may also adjust the shooting parameters of the in-vehicle acquisition apparatus according to weather conditions. For example, when the electronic device learns through the network that current weather is rainy and snowy weather or foggy weather with low light, the aperture and photosensitivity of the in-vehicle acquisition apparatus may be adjusted to be greater than the numerical threshold to ensure the quality of the multimedia guidance content.

In some embodiments, to enable the multimedia guidance content to include important information as much as possible, the electronic device may keep a frame rate of the in-vehicle acquisition apparatus being greater than a frame rate threshold, for example, the frame rate of the in-vehicle acquisition apparatus is no less than 5 frames per second. In some other embodiments, to minimize a storage space occupied by the multimedia guidance content and traffic costs consumed during transmission, the electronic device may keep the frame rate of the in-vehicle acquisition apparatus being less than the frame rate threshold, for example, the frame rate of the in-vehicle acquisition apparatus is set to 2 frames per second.

In some embodiments, when acquiring the multimedia guidance content through the in-vehicle acquisition apparatus, the electronic device may also first pre-process the images captured by the in-vehicle acquisition apparatus, for example, perform processing of zooming, cropping, and image quality enhancement, and then use pre-processed images to form the multimedia guidance content, thereby improving the quality of the multimedia guidance content.

In one or more embodiments, the multimedia guidance content acquired by the electronic device through the in-vehicle acquisition apparatus may be stored in a local storage space of the electronic device, or may be uploaded to a cloud device such as a server via a network, as long as the complete multimedia guidance content can be saved.

In some embodiments, the multimedia guidance content may be a parking route video or a parking route image set acquired by the in-vehicle acquisition apparatus, that is, the electronic device may perform no processing on the parking route video or the parking route image set, and directly determine the parking route video or the parking route image set as the multimedia guidance content, to facilitate transmission of an unprocessed parking route video or the parking route image set to the terminal device when subsequently responding to the multimedia content obtaining request transmitted by the terminal device.

In some embodiments, the electronic device may also remove redundant information in the parking route video or the parking route image set, for example, selecting a plurality of video frames or images that are more similar than a certain threshold, removing the fuzzier video frames or images, thereby determining the parking route video or the parking route image set on which redundant information removal is performed as the multimedia guidance content. Certainly, the electronic device may also recognize and extract the key information in the parking route video or the parking route image set, and then add an enhancement effect to the key information. The enhanced parking route video or the parking route image set may be used as the multimedia guidance content. That is, the electronic device may perform a series of processing processes such as extracting key frames, cropping, extracting important indication information, and the like from the acquired parking route video or parking route image set, and update the processed parking route video or parking route image set to the multimedia guidance content.

In one or more embodiments, the electronic device in S201 and S202 may be implemented as the in-vehicle terminal.

In one or more embodiments, the electronic device continuously analyzes the real time traveling environment during traveling of the vehicle, and when the analysis results represents that the vehicle travels into the parking lot, the electronic device may invoke the in-vehicle acquisition apparatus to capture the environmental information of the parking route and the environmental information of the parking space, to obtain the multimedia guidance content, thereby realizing the effect of automatically performing acquisition of the multimedia guidance content according to a travel scenario of the vehicle, and improving an intelligent degree of acquiring the multimedia guidance content. In addition, since the multimedia guidance content is captured by the in-vehicle acquisition apparatus, there is no need to mount additional cameras in the parking lot, so that costs of the vehicle-searching guidance system may be lower.

In some embodiments, the electronic device performs analysis on a real time traveling environment of the vehicle, to obtain an analysis result, that is, in some embodiments, S201 may include S2011 and S2012, which are as follows:

S2011: The electronic device acquires images or videos of the real time traveling environment of the vehicle by using the in-vehicle acquisition apparatus.

S2012: The electronic device classifies the images or the videos of the real time traveling environment by using a classification model, to obtain the analysis result.

When analyzing the real time traveling environment of the vehicle, the electronic device may acquire images or videos of the real time traveling environment of the vehicle through the in-vehicle acquisition apparatus, and then input the images or videos of the real time traveling environment into the classification model to classify the images or videos of the real time traveling environment through the classification model to determine whether the real time traveling environment is an entrance to the parking lot. That is, the analysis result indicates that whether the image or video of the real time traveling environment is an entrance scenario of the parking lot. When the analysis result indicates that the image or video of the real time traveling environment is indeed the entrance scenario of the parking lot, the electronic device determines the analysis result as the vehicle having traveled into the parking lot. Correspondingly, when the analysis result indicates that the image or video of the real time traveling environment is not the entrance scenario of the parking lot, the electronic device determines the analysis result as the vehicle having not traveled into the parking lot. In this way, the electronic device may obtain the analysis result.

In one or more embodiments, the entrance scenario image of the parking lot may include, but is not limited to, an image of a parking lot entrance gear lever, an image of an underground parking lot entrance, an image of a ground parking lot entrance, and the like, and may also include an indication identifier of the underground parking lot, a name identifier of the ground parking lot, and the like.

The classification model may be a model trained with the entrance scenario images of the various marked parking lots. The classification model may be a deep-layer model such as a Convolutional Neural Networks (CNN) model, and may also be a superficial machine learning model such as a Support Vector Machine (SVM). This is not limited in this embodiment of the present disclosure.

In some embodiments, before classifying the image or video of the real-time driving environment, the electronic device may also pre-process the image or video of the real time traveling environment, for example, perform processing such as zooming, cropping, enhancement on the image of the real time traveling environment, to make the analysis results more accurate; and perform processing such as compression and frame extraction on the video in the real time traveling environment, to speed up classification.

In one or more embodiments, the electronic device can classify the image or video of the real time traveling environment captured by the in-vehicle acquisition apparatus, thereby determining whether the vehicle has entered the parking lot in an image dimension, and improving the intelligence of acquiring the parking route video.

In some embodiments, the electronic device performs analysis on a real time traveling environment of the vehicle, to obtain an analysis result, that is, in some embodiments, S201 may further include S2013, which is as follows:

S2013: The electronic device obtains a real time geographic location of the vehicle by using a positioning apparatus, and determines a positional relationship between the real time geographic location and a geo-fence of the parking lot as the analysis result.

When determining the real time traveling environment of the vehicle, the electronic device may also continuously obtain the real time geographic location of the vehicle through the positioning apparatus on the vehicle. The electronic device compares the real time geographic location with the geo-fence of the parking lot provided by the digital map to determine whether the real time geographic location of the vehicle is inside the geo-fence, thereby obtaining the analysis result. That is, the analysis results are based on whether the real time geographic location is available inside the geo-fence.

The positioning apparatus on the vehicle may be a Global Positioning System (GPS) positioner or a Beidou positioner. This is not limited in this embodiment of the present disclosure.

When the electronic device compares the real time geographic location with the geo-fence and finds that the real time geographic location of the vehicle is inside the geo-fence, it may be determined that the vehicle has entered the parking lot, thereby determining that the analysis result is that the vehicle has entered the parking lot. Correspondingly, when the real time geographic location is outside the geo-fence, the electronic device determines the analysis result is that the vehicle has not entered the parking lot.

It may be understood that S2011-S2012 and S2013 are two parallel implementations of S201, and the electronic device may select one of the two implementations according to an actual condition.

In this embodiment of the present disclosure, the electronic device can also compare the real time geographic location of the vehicle with the geo-fence of the parking lot, thereby determining whether the vehicle has entered the parking lot according to positioning information, and improving the intelligence of acquiring the parking route video.

In one or more embodiments, the electronic device may also combine the real time geographic location and light intensity of the vehicle to determine whether the vehicle has entered the parking lot. For example, the vehicle is considered to have entered the underground parking lot when a distance between the geographic location and the geo-fence is less than a distance threshold and the light intensity is suddenly lower than an intensity threshold; and the vehicle is considered to have entered the ground parking lot when the real time geographic location is inside the geo-fence and the light intensity does not change.

In some embodiments, after the electronic device obtains the multimedia guidance content, that is, after S202, the method may further include: S203 and S204, which are as follows:

S203: The electronic device extracts a key frame from the multimedia guidance content. There may be multiple extracted key frames.

The key frame contains key guidance information, the key guidance information being extracted based on the environmental information of the parking route and the environmental information of the parking space.

In some embodiments of the present disclosure, the key frames include a plurality of consecutive video frames in the multimedia guidance content. In some embodiments of the present disclosure, the key frames include a plurality of independent video frames in the multimedia guidance content.

S204: The electronic device constructs a key route video or a key route image set by using the key frames, and updates the key route video or the key route image set to the multimedia guidance content.

After obtaining the key frames, the electronic device may connect the key frames to form a video in sequence. The obtained video is the key route video, or the key frame directly forms the key route image set, and then the key route video or the key route image set is updated to the multimedia guidance content, to remove the redundancy of the multimedia guidance content, thereby making the multimedia guidance content received by the terminal device more streamlined.

The key route video or the key route image set includes a payment information video or a payment information image set, the payment information video or the payment information image set recording a payment code, and the payment information video or the payment information image set having a corresponding progress bar, the progress bar displaying a progress prompt identifier, the progress prompt identifier corresponding to the key frame.

In some embodiments, the electronic device can further remove a dynamic fuzzy portion in the key frame, and then construct the key route video or the key route image set by using a key frame on which dynamic fuzzy removal is performed. That is, after extracting the key frame from the multimedia guidance content, the electronic device to construct the key route video or the key route image set by using the key frame, that is, after S203 and before S204, the method may further include S205, which is as follows:

S205: Perform fuzzy removal on the key frame to obtain an optimized key frame.

The electronic device may input the key frame into a deep learning model for fuzzy removal, and determine an output of the deep learning model for fuzzy removal as the optimized the key frame. The electronic device may also trim a map for key frame removal of fuzzy portions from adjacent frames of the key frame, and replace the fuzzy portions in the key frame with the map, to obtain the optimized key frame.

In this case, a key route video or a key route image set is constructed by using the key frame, that is, in some embodiments, S204 may be replaced by S204A, which is as follows:

S204A: Construct the key route video or the key route image set by using the optimized key frame.

That is, optimized key frames are used to splice out the key route video, or optimized key frames are combined as the key route image set, so that the quality of the key route video or the key route image set is better.

In some embodiments, the electronic device in S203 may be implemented as the in-vehicle terminal, and the electronic device in S204 may be implemented as the server. In this way, after extracting the key frame from the multimedia guidance content, the in-vehicle terminal may transmit the key frame to the server, and the server generates a key route video or a key route image set by using the key frame, and updates the key route video or the key route image set to the multimedia guidance content, to provide to the terminal device.

In some other embodiments, the electronic device in S203 and S204 may be implemented as the server. In this case, the server first receives irredundant multimedia guidance content (for example, a parking route video or a parking route image set) transmitted by the in-vehicle terminal, and then the server extracts the key frame, generates the key route video or the key route image set, and updates the multimedia guidance content.

In one or more embodiments, the electronic device in S203 and S204 may also be implemented as the in-vehicle terminal, that is, after acquiring the multimedia guidance content (the parking route video or the parking route image set), the in-vehicle terminal may further extract the key frame, generates the key route video or the key route image set, and updates the multimedia guidance content.

In this embodiment of the present disclosure, the electronic device can extract the key frame from the multimedia guidance content, generate the key route video or the key route image set, and update the multimedia guidance content based on the key route video or the key route image set, thereby reducing redundancy of the multimedia guidance content.

In some embodiments of the present disclosure, the electronic device extracts a key frame from the multimedia guidance content, that is, a specific implementation process of S203 may include: performing one of the following processing on the multimedia guidance content:

S2031: The electronic device extracts the key frame from the multimedia guidance content by using a distance threshold that the vehicle travels as an extraction interval.

The electronic device may detect a travel distance of the vehicle. When the vehicle travels farther than the distance threshold, the electronic device may extract some video frames from video frames of the multimedia guidance content, and the key frame is obtained after frame extraction is performed.

In one or more embodiments, the distance threshold may be set to 5 meters, or may be set to 10 meters, or may be set to another numerical value according to an actual situation. This is not limited in this embodiment of the present disclosure. The quantity of extracted video frames may be set to 1, or may be set to 3, or may be set to another numerical value according to an actual situation. This is not limited in this embodiment of the present disclosure.

It may be understood that, since the distance traveled by the vehicle is proportional to the speed of the vehicle, that is, the greater the distance traveled by the vehicle within the same time, the greater the speed of the vehicle. In this case, the distance threshold traveled by the vehicle is used as the extraction interval, and some video frames are extracted, which can ensure that the frame extraction interval changes with the speed of the vehicle. That is, a faster travel speed indicates a smaller frame extraction interval, and a slower travel speed indicates a larger frame extraction interval. In this way, it may be ensured that sufficient environmental information can be acquired when the vehicle is traveling at a relatively high speed.

S2032: The electronic device selects a target frame extraction interval corresponding to the real time traveling environment from a plurality of frame extraction intervals according to the real time traveling environment of the vehicle, and extracts the key frame from the multimedia guidance content according to the target frame extraction interval.

In addition to controlling frame extraction according to the travel distance of the vehicle, the electronic device may also find a target frame extraction interval corresponding to the real time traveling environment from a plurality of frame extraction intervals according to the environment of the place where the vehicle is traveling, and then perform frame extraction on the multimedia guidance content according to the target frame extraction interval to obtain the key frame.

The frame extraction interval may be set according to an actual requirement. For example, the frame extraction interval is set to 10, or is set to 8, and the like. This is not limited in this embodiment of the present disclosure.

It may be understood that, when the electronic device selects a corresponding target frame extraction interval from the plurality of frame extraction intervals according to the real time traveling environment, the frame interval can be adjusted adaptively in accordance with the location where the vehicle is traveling by selecting the corresponding target frame interval in accordance with the larger frame interval at some locations where more environmental information is not required to be retained, and in accordance with the smaller frame interval at some locations where sufficient environmental information is required to be retained.

For example, when the vehicle just enters the parking lot, it is not necessary to retain a large amount of environmental information, and therefore, the frame extraction interval corresponding to the parking lot entrance may be set to 10 frames. It is necessary to retain more environmental information when the vehicle is near the parking space, and therefore the corresponding frame extraction interval may be set to 3 to retain enough environmental information.

S2033: The electronic device extracts a video frame that recognizes the key guidance information from the multimedia guidance content, to obtain the key frame.

The electronic device may also recognize whether the location at which the vehicle is traveling includes key guidance information. When the location where the vehicle is traveling includes the key guidance information, the video frame including the key guidance information may be extracted, and the extracted video frame is used as the key frame.

In this embodiment of the present disclosure, the electronic device can determine a frame extraction interval and extract a key frame based on the travel distance of the vehicle, or can determine a frame extraction interval and extract a key frame based on the real time traveling environment of the vehicle, or can extract a key frame from the multimedia guidance content adaptively according to the travel condition of the vehicle based on the recognition result of the key guide information, thereby improving the intelligent degree of key frame extraction.

In some embodiments of the present disclosure, the electronic device may also select some video frames from the unextracted video frames to be added to the key frame after frame extraction is performed on the multimedia guidance content. In other words, after extracting a key frame from the multimedia guidance content and before the constructing a key route video or a key route image set by using the key frame, that is after S203 and before S204, the method further includes: S206, which is as follows:

S206: Select a candidate video frame from remaining content of the multimedia guidance content.

The remaining content being content in the multimedia guidance content other than the key frame, and the candidate video frame including at least a video frame including text information, a video frame during reversing, and a video frame including a two-dimensional code.

In some cases, the electronic device constructs a key route video or a key route image set by using the key frame, that is, a specific implementation process of S204 may be transformed into S204B, which is as follows:

S204B: Construct the key route video or the key route image set by using the key frame and the candidate video frame.

That is, the electronic device may select a video frame including text information, a video frame during reverse, and a video frame including a two-dimensional code from the video frames other than the key frame, and add the video frame to the key frame to reconstruct the key route video or the key route image set from the key frame that have been added to the video frames, so that the key route video or the key route image set include more useful information.

In some embodiments of the present disclosure, the electronic device extracts a video frame that recognizes the key guidance information from the multimedia guidance content, to obtain the key frame, that is, a specific implementation process of S2033 may include: S2033*a* and S2033*b* which are as follows:

S2033*a*: The electronic device recognizes text of the video frame in the multimedia guidance content, to obtain the key guidance information.

The electronic device may recognize text of video frames in the multimedia guidance content by using deep learning, optical character recognition (OCR), and other technologies, to obtain text information of such video frames, then analyze the meaning of the text information, and extract the key guidance information corresponding to the key frames from the text information.

Exemplary, when the video frame includes an image having a number of parking space, the electronic device may recognize the number in the video frame, which is the key guidance information, and the video frame is the key frame.

S2033*b*: The electronic device extracts the video frame including the key guidance information, to obtain the key video frame.

Once the electronic device has recognized the key guidance information, the video frame including the key guidance information is extracted from the multimedia guidance content to obtain the key frame. In some embodiments, the electronic device may further determine a corresponding position of the key frame on the progress bar, and add a progress prompt identifier on the position.

In this embodiment of the present disclosure, the electronic device extracts the key guidance information from each video frame of the multimedia guidance content through text recognition, and then determines the video frame including the key guidance information as the key frame, thereby completing the extraction process of the key frame, and improving the intelligent degree of key frame extraction.

In some embodiments of the present disclosure, a specific implementation process in which the electronic device constructs a key route video or a key route image set by using the key frame is a specific implementation process of S204, which may include S2041, S2042, and any one of S2043 or S2044:

S2041: The electronic device selects a scanned video frame including a scan code from the key frame.

When constructing the key route video or the key route image set, the electronic device may also perform image recognition on each key frame, extract a video frame including a scan code from the key frame, and record the extracted video frame as the scanned video frame. The scan code includes a two-dimensional code and a barcode.

S2042: The electronic device determines a purpose of the scan code in the scanned video frame, to obtain purpose information of the scan code.

The electronic device recognizes and parses the scan code in the scanned video frame, to determine the purpose of the scan code and obtain the purpose information of the scan code. That is, in this embodiment of the present disclosure, to avoid the target object from confusing the scan code for other purposes with the payment code for parking fees, the electronic device may determine the purpose of the scan code in advance to exclude scan code for other purposes in the key route video or the key route image set.

S2043: The electronic device constructs, when the purpose information of the scan code is payment, the key route video or the key route image set by using the key frame including the scanned video frame.

S2044: The electronic device removes the scanned video frame from the key frame when the purpose information of the scan code is not payment, and constructs the key route video or the key route image set by using a key frame in which the scanned video frame is removed.

That is, when the electronic device determines that the scan code is not a payment code, the scanned video frame including the scan code is removed from the key frame to exclude the scan code for other purposes from the key frame. Then, the electronic device may splice the key frame in sequence after removing the scanned video frames, to obtain the key route video frame, or directly combine the key frames after the proposed scanned video frames into a set to obtain the key route image set.

In this embodiment of the present disclosure, the electronic device can recognize the scan code in the scanned video frame, and delete the scanned video frame from the key video frame when it is determined that the scan code is not the payment code, thereby optimizing the key frame.

In some embodiments of the present disclosure, the in-vehicle acquisition apparatus includes a front-facing camera and a surround view camera. In this case, the electronic device acquires environmental information of a parking route of the vehicle from start of traveling into the parking lot to stop of traveling and the environmental information of the parking space by using the in-vehicle acquisition apparatus, to obtain the multimedia guidance content, that is, a specific implementation of S202 may include: S2021, and one of S2022 or S2023, which are as follows:

S2021: The electronic device obtains a historical quantity of parking times of the vehicle in the parking lot.

When acquiring the environmental information of the parking route and the environmental information of the parking space, the electronic device may first distinguish whether the target object frequently visits the parking lot. In this case, the electronic device may collect statistics on a quantity of times that the target object has visited the parking lot at the historical time from the Internet or own storage space, thereby obtaining the historical quantity of parking times.

S2022: The electronic device uses a front-facing camera and a surround view camera as the in-vehicle acquisition apparatus when the historical quantity of parking times is less than a parking quantity-of-times threshold, to acquire the environmental information of the parking route and the environmental information of the parking space.

When the historical quantity of parking times is less than a parking quantity-of-times threshold, it indicates that the parking lot is likely to be a parking lot unfamiliar to the target object, and more environmental information needs to be acquired as much as possible. Therefore, the electronic device may simultaneously invoke the front-facing camera and the surround view camera, and then use the front-facing camera and the surround view camera as the in-vehicle acquisition apparatus to simultaneously acquire the environmental information of the parking route and the environmental information of the parking space, to obtain richer environmental information, so that the target object may find the vehicle in the unfamiliar parking lot.

In one or more embodiments, the parking quantity-of-times threshold may be set according to actual requirements. For example, the parking quantity-of-times threshold may be set to 5, or set to 3. This is not limited in this embodiment of the present disclosure.

S2023: The electronic device uses the front-facing camera as the in-vehicle acquisition apparatus when the historical quantity of parking times is greater than or equal to the parking quantity-of-times threshold, to acquire the environmental information of the parking route and the environmental information of the parking space.

When the historical quantity of parking times is greater than or equal to the parking quantity-of-times threshold, it indicates that the target object has visited the parking lot for many times and is relatively familiar with the parking lot. In this case, the electronic device may acquire the environmental information of the parking route and the environmental information of the parking space only through the front-facing camera, to save storage resources occupied by the multimedia guidance content.

Certainly, in some embodiments, when the historical quantity of parking times is greater than the parking quantity-of-times threshold, the electronic device may not acquire the multimedia guidance content, that is, both the front-facing camera and the surround view camera are not turned on.

In this embodiment of the present disclosure, the electronic device can obtain the historical quantity of parking times of the vehicle in the parking lot, and then determine whether the target object frequently visits the parking lot through a magnitude relationship between the historical quantity of parking times and the parking quantity-of-times threshold, thereby determining which cameras to be used to acquire the environmental information of the parking route and the environmental information of the parking space, and improving the intelligence degree of acquiring the multimedia guidance content.

In some embodiments, the surround view camera may also start recording after the target object has manually turned on the surround view function, so that the surround view camera can meet the target object's requirements.

The following describes an exemplary application of the vehicle-searching guidance method in an actual application scenario.

The vehicle-searching guidance method is implemented in a scenario where the user is searching for a vehicle in a parking lot by using a mobile phone. In this embodiment, the user (target object) may view a video (including environmental information of the parking route and environmental information of the parking space) of the vehicle from the time when the vehicle enters the parking lot to the time when the vehicle stops in the parking space through the mobile phone (terminal device), and the video is recorded by the in-vehicle acquisition apparatus. In the video, there may also be a two-dimensional code (payment code) for the parking lot, and the user can pay a parking fee through the two-dimensional code in the video.

In the video, useful information for the user includes, but is not limited to, the location of the landmark (information about the bottom passed by the parking route), the floor on which the vehicle is parked (information about the floor on which the parking space is located), two-dimensional code information of the parking payment (the payment code), the environment near the parking space, the number information of the vehicle and the parking space (the number information of the parking space, the appearance information of other vehicles adjacent to the vehicle), the information directly in front of the parking space (the environmental information directly in front of the parking space), and the surround view image (the surround view image of the parking space).

Figure 14:
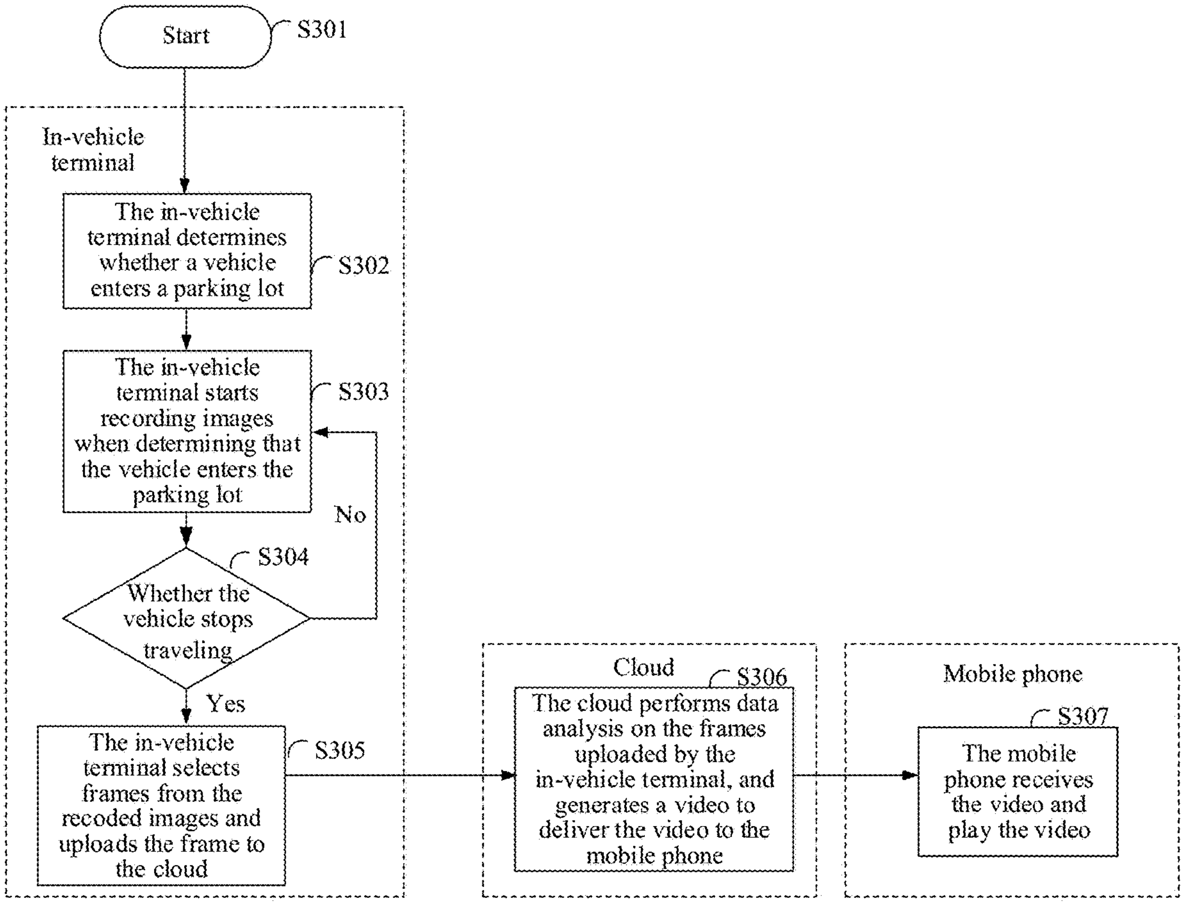
FIG. 14 is a schematic diagram of a process of searching a vehicle by using a mobile phone according to an embodiment of the present disclosure.

The following describes a process of finding a vehicle starting from video recording by using a mobile phone. FIG. 14 is a schematic diagram of a process of searching a vehicle by using a mobile phone according to this embodiment. Referring to FIG. 14, the process includes:

S301: Start.

S302: The in-vehicle terminal determines whether a vehicle enters a parking lot.

The in-vehicle terminal (electronic device) invokes the in-vehicle acquisition apparatus to acquire environmental images (images or videos of the real time traveling environment) near the vehicle at a certain frame rate, and determines that the vehicle has entered the low parking lot through a model or with reference to other information.

S303: The in-vehicle terminal starts recording images when determining that the vehicle enters the parking lot.

After it is determined that the vehicle has entered the underground parking lot, the in-vehicle terminal records the image at a frame rate higher than the threshold, or otherwise, the image is recorded at an array lower than the threshold.

S304: The in-vehicle terminal determines whether the vehicle stops traveling.

The in-vehicle terminal determines whether to stop the vehicle with reference to a body sensor and other data. If yes, perform S305; and if no, perform S303.

S305: The in-vehicle terminal selects frames from the recoded images and uploads the frame to the cloud.

With reference to the speed of the vehicle and text in the video during the recording, the in-vehicle terminal extracts some image frames (the key frames) to be uploaded to the cloud (the server, an embodiment of the electronic device) or the mobile phone of the user.

S306: The cloud performs data analysis on the frames uploaded by the in-vehicle terminal, and generates a video to deliver the video to the mobile phone.

The cloud analyzes the received video frames, obtains useful information (key guidance content), and generates a video (updated to the multimedia guidance content of the key route video) to be delivered to the user.

S307: The mobile phone receives the video and play the video.

The phone plays the video on the display screen, so that the user can view useful information.

In one or more embodiments, in S302, the in-vehicle acquisition apparatus needs to capture a color image (an image or video of the real time traveling environment) with sufficient clarity of the environmental information near the vehicle, the in-vehicle acquisition apparatus needs to acquire a condition of a road surface of the parking lot, and the viewing angle cannot be too inclined downward or upward. The in-vehicle terminal may perform pre-processing such as zooming, cropping, enhancement, and the like on a corresponding image. The in-vehicle terminal may recognize the environment image near the vehicle by a classification model with an output as a discrete amount and a model (classification model) with output content of a subdivision scenario (classification result). The subdivision scenario can be divided into: an underground parking lot, a ground parking lot, a parking lot entrance gear lever, and the like. The output of the classification model may also be a two-point result, such as whether to start recording or not. The in-vehicle terminal may determine whether to enter the parking lot with reference to the GPS signal (real time geographic location), the light intensity output by the light sensor, the geo-fence provided by the map information, and the like.

In S303, the in-vehicle terminal invokes the in-vehicle acquisition apparatus to start recording, and a larger aperture, a higher photosensitivity, and a smaller shutter are kept as much as possible during recording, to ensure the recording quality. Furthermore, a recording frame rate of the in-vehicle acquisition apparatus cannot be too low, causing important information to be missed. For example, the frame rate is required to be no less than 5 frames per second, and recording is retained locally. The front-facing camera has been recording, and the surround view camera may start recording after the user manually turns on a surround view function. The frame rate and other requirements are the same as the above.

In S304, the in-vehicle terminal may determine whether the vehicle is stationary according to the angular velocity sensor in the inertial measurement unit with reference to the acceleration sensor, determine whether the vehicle is stationary according to the wheel velocity measured by the wheel velocity sensor, and determine whether the vehicle is stationary according to the image captured by in-vehicle acquisition apparatus.

In S305, when the in-vehicle terminal is connected to the mobile phone through Bluetooth, Wi-Fi, and the like, a complete video (without the redundant multimedia guidance content in the past) may be transmitted to the mobile phone. Otherwise, to save the traffic fee during uploading of video, some key frames (key frames) may be extracted for uploading. In the frame extraction process, the in-vehicle terminal may extract every x frames, x dynamically changes with the speed of the vehicle, for example, a faster speed indicates smaller x, a slower speed indicates larger x, that is, the same upload distance per travel (where distance threshold traveled by the vehicle is used as the extraction interval, and the key frame is extracted from the multimedia guidance content) needs to be ensured as much as possible, or x is larger when just traveling into the garage (real time traveling environment), x is smaller when close to the parking space (real time traveling environment) (where the corresponding target frame extraction interval is selected from a plurality of frame extraction intervals according to the real time traveling environment), to ensure that there is enough information when solving the parking space. After frame extraction is completed, some unselected video frames are continuously selected to be added to the key frame, for example, a frame including text, a frame during reverse, a frame including a two-dimensional code, and the like are added to the key frame.

In S306, the cloud detects key text information (key guidance information) on the key frame and records, to focus on prompts in the video playback progress bar (prompted by the progress prompt identifier). The cloud detects the two-dimensional code information (scan code), analyzes the two-dimensional code and decides whether it is the parking payment two-dimensional code (payment code), and deletes it when it is not the payment two-dimensional code. The cloud removes dynamic fuzzy from the image through digital image processing or deep learning techniques, such as a deblurgan2 model. The cloud generates a video delivered to the user.

S307 runs on the user's mobile phone, which may be software, applets, and the like on the phone. The phone receives a video downloading operation by the user, and then downloads the video for the user, or receives a click by the user to recognize the payment two-dimensional code (the trigger operation on the third control) and pops up a payment interface for the user.

In one or more embodiments, a video recording the period of time between entering the parking lot and the car stopping at the parking space can be provided to the user to enable the user to reverse search for the vehicle according to the video, improving the efficiency of reverse vehicle searching. Furthermore, the embodiments of the present disclosure only need to acquire the video through the in-vehicle terminal and upload the video to the cloud. No additional infrastructure investment is required, and the complexity and cost of the system may be low.

This embodiment of the present disclosure involves the real time geographic location of the vehicle, such as the user information, the video or image of the environmental information of the parking lot where the user parks, and the video or image of the route for the user to park, and other relevant data. When a specific product or technology is applied to this embodiment of the present disclosure, the user's permission or consent is required, and acquisition, use, and processing of the relevant data need to comply with the relevant laws and standards of the relevant countries and regions.

The following further illustrates an exemplary structure in which the vehicle-searching guidance apparatus 455 provided in this embodiment of the present disclosure is implemented as software modules. In some embodiments, as shown in FIG. 4, the software module stored in the vehicle-searching guidance apparatus 455 of the first memory 450 may include:

an information display module 4551, configured to display a vehicle-searching guidance interface in response to a first trigger operation on a first control, the vehicle-searching guidance interface being used for providing guidance information for vehicle searching;

a first transmission module 4552, configured to transmit a multimedia content obtaining request to an electronic device in response to a second trigger operation on a second control on the vehicle-searching guidance interface; and a first receiving module 4553, configured to receive multimedia guidance content returned by the electronic device according to the multimedia content obtaining request, the multimedia guidance content recording environmental information of a parking space in which a vehicle is parked, the information display module 4551, further configured to guide, by playing the multimedia guidance content, a target object to search for the vehicle.

In some embodiments of the present disclosure, the information display module 4551 is further configured to display a payment page in response to a trigger operation on a third control, the payment page being used for the target object to pay a parking fee.

In some embodiments of the present disclosure, the multimedia guidance content further records environmental information of a parking route, and a progress bar corresponding to the multimedia guidance content displays a progress prompt identifier; and the information display module 4551 is further configured to jump to a key frame corresponding to the progress prompt identifier in response to a trigger operation on the progress prompt identifier, and start playing the multimedia guidance content from the key frame corresponding to the progress prompt identifier, to guide the target object to search for the vehicle, the key frame recording key guidance information, the key guidance information being extracted from the environmental information of the parking route and the environmental information of the parking space.

In some embodiments of the present disclosure, the information display module 4551 is further configured to: display an enhancement effect on the key guidance information when the multimedia guidance content is played from the key frame corresponding to the progress prompt identifier, the enhancement effect including at least one of an arrow, an annotation box, a star effect, or a blinking effect.

The following further illustrates an exemplary structure in which the vehicle-searching guidance apparatus 255 provided in this embodiment of the present disclosure is implemented as software modules. In some embodiments, as shown in FIG. 5, the software module stored in the vehicle-searching guidance apparatus 255 of the second memory 250 may include:

a second receiving module 2551, configured to receive a multimedia content obtaining request transmitted by a terminal device;

a video obtaining module 2552, configured to obtain corresponding multimedia guidance content in response to the multimedia content obtaining request, the multimedia guidance content recording environmental information of a parking space in which a vehicle is parked, and the multimedia guidance content being obtained based on an in-vehicle acquisition apparatus; and a second transmission module 2553, configured to transmit the multimedia guidance content to the terminal device, the multimedia guidance content being used for guiding a target object to search for the vehicle.

In some embodiments of the present disclosure, the multimedia guidance content further records the environmental information of the parking route, and the vehicle-searching guidance apparatus 255 further includes a video recording module 2554.

The video recording module 2554 is configured to perform analysis on a real time traveling environment of the vehicle, to obtain an analysis result; and acquire, when the analysis result indicates that the vehicle travels into a parking lot, environmental information of a parking route of the vehicle from start of traveling into the parking lot to stop of traveling and the environmental information of the parking space by using the in-vehicle acquisition apparatus, to obtain the multimedia guidance content.

In some embodiments of the present disclosure, the video recording module 2554 is further configured to: acquire images or videos of the real time traveling environment of the vehicle by using the in-vehicle acquisition apparatus; classify the images or the videos of the real time traveling environment by using a classification model, to obtain the analysis result; or obtain a real time geographic location of the vehicle by using a positioning apparatus, and determine a positional relationship between the real time geographic location and a geo-fence of the parking lot as the analysis result.

In some embodiments of the present disclosure, the video recording module 2554 is further configured to: extract a key frame from the multimedia guidance content, the key frame recording key guidance information, the key guidance information being extracted based on the environmental information of the parking route and the environmental information of the parking space; and construct a key route video or a key route image set by using the key frame, and update the key route video or the key route image set to the multimedia guidance content.

In some embodiments of the present disclosure, the video recording module 2554 is further configured to perform one of the following processing on the multimedia guidance content: extracting the key frame from the multimedia guidance content by using a distance threshold that the vehicle travels as an extraction interval; selecting a target frame extraction interval corresponding to the real time traveling environment from a plurality of frame extraction intervals according to the real time traveling environment of the vehicle, and extracting the key frame from the multimedia guidance content according to the target frame extraction interval; or extracting a video frame that recognizes the key guidance information from the multimedia guidance content, to obtain the key frame.

In some embodiments of the present disclosure, the video recording module 2554 is further configured to: obtain a historical quantity of parking times of the vehicle in the parking lot; use a front-facing camera and a surround view camera as the in-vehicle acquisition apparatus when the historical quantity of parking times is less than a parking quantity-of-times threshold, to acquire the environmental information of the parking route and the environmental information of the parking space; and use the front-facing camera as the in-vehicle acquisition apparatus when the historical quantity of parking times is greater than or equal to the parking quantity-of-times threshold, to acquire the environmental information of the parking route and the environmental information of the parking space.

In some embodiments of the present disclosure, the video recording module 2554 is further configured to: select a candidate video frame from remaining content of the multimedia guidance content, the remaining content being content in the multimedia guidance content other than the key frame, and the candidate video frame including at least a video frame including text information, a video frame during reversing, and a video frame including a two-dimensional code; and construct the key route video or the key route image set by using the key frame and the candidate video frame.

In some embodiments of the present disclosure, the video recording module 2554 is further configured to: perform fuzzy removal on the key frame to obtain an optimized key frame; and construct the key route video or the key route image set by using the optimized key frame.

In some embodiments of the present disclosure, the video recording module 2554 is further configured to: select a scanned video frame including a scan code from the key frame, the scan code including a two-dimensional code and a barcode; determining a purpose of the scan code in the scanned video frame, to obtain purpose information of the scan code; constructing, when the purpose information of the scan code is payment, the key route video or the key route image set by using the key frame including the scanned video frame; and remove the scanned video frame from the key frame when the purpose information of the scan code is not payment, and construct the key route video or the key route image set by using a key frame in which the scanned video frame is removed.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

An embodiment of the present disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the foregoing vehicle-searching guidance method described in the embodiments of the present disclosure.

An embodiment of the present disclosure provides a computer-readable storage medium storing executable instructions, the executable instructions, when executed by a first processor, causing the first processor to perform the vehicle-searching guidance method on a terminal device side provided in this embodiment of the present disclosure, or when executed by a second processor, causing the second processor to perform the vehicle-searching guidance method on an electronic device side provided in this embodiment of the present disclosure.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In one or more embodiments, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In one or more embodiments, the executable instructions may be deployed to be executed on a computing device (which is an electronic device or a terminal device), or deployed to be executed on a plurality of computing devices at the same location, or deployed to be executed on a plurality of computing devices that are distributed in a plurality of locations and interconnected by using a communication network.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. A vehicle-searching guidance method, performed by a terminal device, the method comprising:

displaying a vehicle-searching guidance interface in response to a first trigger operation on a first control, the vehicle-searching guidance interface being used for providing guidance information for vehicle searching;

transmitting a multimedia content obtaining request to an electronic device in response to a second trigger operation on a second control on the vehicle-searching guidance interface;

receiving a key route video or a key route image set returned by the electronic device according to the multimedia content obtaining request, the key route video or the key route image set being generated from key frames containing key guidance information, and the key route video or the key route image set describing environmental information of a parking space in which a vehicle is parked; and presenting the key route video in a video playback region of the vehicle-searching guidance interface or presenting the key route image set in a graphic text information display region of the vehicle-searching guidance interface, for a user to search for the vehicle.

2. The method according to claim 1, further comprising:

displaying a payment page in response to a trigger operation on a third control, the payment page being used to pay a parking fee.

3. The method according to claim 1, wherein the key route video further includes environmental information of a parking route, and a progress bar corresponding to the key route video displays a progress prompt identifier; and the method further comprises:

jumping to a key frame corresponding to the progress prompt identifier in response to a trigger operation on the progress prompt identifier, and playing the key route video starting from the key frame corresponding to the progress prompt identifier, wherein the key guidance information is extracted from the environmental information of the parking route and the environmental information of the parking space.

4. The method according to claim 1, wherein the key guidance information comprises at least one of number information of the parking space, information about a landmark passed by the parking route, information about a floor on which the parking space is located, a payment code, appearance information of another vehicle adjacent to the vehicle, environmental information directly in front of the parking space, or a surround view image of the parking space.

5. The method according to claim 3, wherein an enhancement effect on the key guidance information is displayed when the key route video is played from the key frame corresponding to the progress prompt identifier, the enhancement effect comprising at least one of an arrow, an annotation box, a star effect, or a blinking effect.

6. A vehicle-searching guidance method, performed by an electronic device, the method comprising:
receiving a multimedia content obtaining request transmitted by a terminal device;
in response to the multimedia content obtaining request, obtaining videos or images about environmental information of a parking space in which a vehicle is parked, the videos or the images being obtained based on an acquisition apparatus coupled to a vehicle;
extracting, from the videos or images, key frames containing key guidance information, and constructing a key route video or a key route image set by using the key frames, and
transmitting the key route video or the key route image to the terminal device, for guiding a user to search for the vehicle.

7. The method according to claim 6, wherein the videos or the images further includes environmental information of a parking route, and the method further comprises:
performing analysis on a real time traveling environment of the vehicle, to obtain an analysis result; and
acquiring, when the analysis result indicates that the vehicle is traveling into a parking lot, environmental information of a parking route of the vehicle from a beginning to an end of the traveling in the parking lot and the environmental information of the parking space by using the acquisition apparatus, to obtain the videos or the images.

8. The method according to claim 7, wherein the performing analysis on a real time traveling environment of the vehicle, to obtain an analysis result comprises:
acquiring the images or the videos of the real time traveling environment of the vehicle by using the acquisition apparatus;
classifying the images or the videos of the real time traveling environment by using a classification model, to obtain the analysis result.

9. The method according to claim 7, wherein the performing analysis on a real time traveling environment of the vehicle, to obtain an analysis result comprises:
obtaining a real time geographic location of the vehicle by using a positioning apparatus, and determining a positional relationship between the real time geographic location and a geo-fence of the parking lot as the analysis result.

10. The method according to claim 7, wherein:
the key guidance information is extracted based on the environmental information of the parking route and the environmental information of the parking space.

11. The method according to claim 6, wherein the extracting key frames from the videos or the images comprises one of:
extracting the key frames from the videos or the images by using a distance threshold that the vehicle travels as an extraction interval;
selecting a target frame extraction interval corresponding to the real time traveling environment from a plurality of frame extraction intervals according to the real time traveling environment of the vehicle, and extracting the key frames from the videos or the images according to the target frame extraction interval; or
extracting a video frame that recognizes the key guidance information from the videos or the images, to obtain the key frames.

12. The method according to claim 6, wherein the key route video or the key route image set comprises a payment information video or a payment information image set, the payment information video or the payment information image set recording a payment code, and the payment information video or the payment information image set having a corresponding progress bar, the progress bar displaying a progress prompt identifier, the progress prompt identifier corresponding to the key frame.

13. The method according to claim 7, further comprising
obtaining a historical quantity of parking times of the vehicle in the parking lot;
using a front-facing camera and a surround view camera as the acquisition apparatus when the historical quantity of parking times is less than a parking quantity-of-times threshold, to acquire the environmental information of the parking route and the environmental information of the parking space; and
using the front-facing camera as the acquisition apparatus when the historical quantity of parking times is greater than or equal to the parking quantity-of-times threshold, to acquire the environmental information of the parking route and the environmental information of the parking space.

14. The method according to claim 10, wherein the key frame comprises a plurality of consecutive video frames in the videos or images obtained by using the acquisition apparatus coupled to the vehicle.

15. The method according to claim 10, wherein the method further comprises:
selecting a candidate video frame from remaining content of the videos or the images, the remaining content being content in the videos or the images other than the key frame, and the candidate video frame comprising at least a video frame comprising text information, a video frame during reversing, and a video frame comprising a two-dimensional code; and
the constructing a key route video or a key route image set by using the key frame comprises:
constructing the key route video or the key route image set by using the key frame and the candidate video frame.

16. The method according to claim 10, wherein the method further comprises:
performing fuzzy removal on the key frame to obtain an optimized key frame; and
the constructing a key route video or a key route image set by using the key frame comprises:
constructing the key route video or the key route image set by using the optimized key frame.

17. The method according to claim 12, wherein the constructing a key route video or a key route image set by using the key frame comprises:
selecting a scanned video frame comprising a scan code from the key frame, the scan code comprising a two-dimensional code and a barcode;
determining a purpose of the scan code in the scanned video frame, to obtain purpose information of the scan code;
constructing, when the purpose information of the scan code is payment, the key route video or the key route image set by using the key frame comprising the scanned video frame; and
removing the scanned video frame from the key frame when the purpose information of the scan code is not payment, and constructing the key route video or the key route image set by using a key frame in which the scanned video frame is removed.

18. A non-transitory computer-readable storage medium, storing executable instructions configured to implement, when executed by a processor of a terminal device, causing the processor to implement:

displaying a vehicle-searching guidance interface in response to a first trigger operation on a first control, the vehicle-searching guidance interface being used for providing guidance information for vehicle searching;

transmitting a multimedia content obtaining request to an electronic device in response to a second trigger operation on a second control on the vehicle-searching guidance interface;

receiving a key route video or a key route image set returned by the electronic device according to the multimedia content obtaining request, the key route video or the key route image set being generated from key frames containing key guidance information, and the key route video or the key route image set describing environmental information of a parking space in which a vehicle is parked; and presenting the key route video in a video playback region of the vehicle-searching guidance interface or presenting the key route image set in a graphic text information display region of the vehicle-searching guidance interface, for a user to search for the vehicle.

19. The storage medium according to claim 18, wherein:

the key guidance information comprises at least one of number information of the parking space, information about a landmark passed by the parking route, information about a floor on which the parking space is located, a payment code, appearance information of another vehicle adjacent to the vehicle, environmental information directly in front of the parking space, or a surround view image of the parking space.

20. The storage medium according to claim 18, wherein the key route video further includes environmental information of a parking route, and a progress bar corresponding to the key route video displays a progress prompt identifier; and the executable instructions further causes the processor to implement:

jumping to a key frame corresponding to the progress prompt identifier in response to a trigger operation on the progress prompt identifier, and playing the key route video starting from the key frame corresponding to the progress prompt identifier, wherein the key guidance information is extracted from the environmental information of the parking route and the environmental information of the parking space.

* * * * *